US011763283B2

(12) United States Patent
Modi et al.

(10) Patent No.: US 11,763,283 B2
(45) Date of Patent: *Sep. 19, 2023

(54) METHODS AND APPARATUS FOR UNIFIED INVENTORY AND FINANCIAL TRANSACTION MANAGEMENT

(71) Applicant: Worldpay US, Inc., Atlanta, GA (US)

(72) Inventors: Nish Modi, Round Rock, TX (US); George Cowsar, Dripping Springs, TX (US); Oleksii Skutarenko, Cedar Park, TX (US)

(73) Assignee: Worldpay US, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,586

(22) Filed: Jul. 25, 2022

(65) Prior Publication Data

US 2022/0358477 A1 Nov. 10, 2022

Related U.S. Application Data

(63) Continuation of application No. 17/101,899, filed on Nov. 23, 2020, now Pat. No. 11,436,583, which is a (Continued)

(51) Int. Cl.
*G06Q 20/20* (2012.01)
*G06Q 20/02* (2012.01)
(Continued)

(52) U.S. Cl.
CPC ......... *G06Q 20/202* (2013.01); *G06Q 10/087* (2013.01); *G06Q 20/027* (2013.01);
(Continued)

(58) Field of Classification Search
CPC .. G06Q 20/202; G06Q 10/087; G06Q 20/027; G06Q 20/12; G06Q 20/203;
(Continued)

(56) References Cited

U.S. PATENT DOCUMENTS

2003/0014317 A1 1/2003 Siegel et al.
2009/0164330 A1* 6/2009 Bishop ................... G06Q 20/02
705/19
(Continued)

OTHER PUBLICATIONS

International Search Report and Written Opinion dated Oct. 19, 2015, in corresponding International Application No. PCT/US2015/042076 (pp. 1-13).

*Primary Examiner* — Garcia Ade
(74) *Attorney, Agent, or Firm* — Bookoff McAndrews, PLLC

(57) ABSTRACT

In some embodiments, a system includes one or more computers configured to implement by executing instructions on one or more processors a platform-agnostic transaction-related communication system. The transaction-related communication system includes one or more receiving modules for receiving a first item of financial transaction information from a customer-facing interface, and receiving a second item of financial transaction information from a merchant-facing point-of-sale interface. In some embodiments, the transaction-related communication system includes a point of sale server for rendering in a common internal format the first item of financial transaction information from the customer-facing interface, and rendering in the common internal format the second item of financial transaction information from the merchant-facing point-of-sale interface. In some embodiments, the transaction-related communication system includes a payment processing module for rendering in a second format the first item of financial transaction information for payment processing by a first external financial party.

20 Claims, 33 Drawing Sheets

Related U.S. Application Data continuation of application No. 16/156,101, filed on Oct. 10, 2018, now Pat. No. 10,878,393, which is a continuation of application No. 14/808,383, filed on Jul. 24, 2015, now Pat. No. 10,115,095.

(60) Provisional application No. 62/081,329, filed on Nov. 18, 2014, provisional application No. 62/030,335, filed on Jul. 29, 2014, provisional application No. 62/028,933, filed on Jul. 25, 2014, provisional application No. 62/028,763, filed on Jul. 24, 2014.

(51) Int. Cl.
*G06Q 20/12* (2012.01)
*G06Q 10/087* (2023.01)
*G06Q 30/04* (2012.01)
*G06Q 30/0601* (2023.01)
*G06Q 20/40* (2012.01)
*G06Q 20/32* (2012.01)
*G06Q 30/0201* (2023.01)

(52) U.S. Cl.
CPC ........... *G06Q 20/12* (2013.01); *G06Q 20/203* (2013.01); *G06Q 20/3226* (2013.01); *G06Q 20/401* (2013.01); *G06Q 20/405* (2013.01); *G06Q 30/0201* (2013.01); *G06Q 30/04* (2013.01); *G06Q 30/0601* (2013.01)

(58) Field of Classification Search
CPC ............. G06Q 20/3226; G06Q 20/401; G06Q 20/405; G06Q 30/0201; G06Q 30/04; G06Q 30/0601
USPC .......................................................... 705/21
See application file for complete search history.

(56) References Cited

U.S. PATENT DOCUMENTS

| | | | |
|---|---|---|---|
| 2011/0071892 A1* | 3/2011 | Dickelman | G06Q 20/20 705/14.17 |
| 2011/0208659 A1 | 8/2011 | Easterly et al. | |
| 2012/0290422 A1* | 11/2012 | Bhinder | G06Q 20/20 705/21 |
| 2013/0138516 A1 | 5/2013 | White | |

* cited by examiner

| < | | Sales | | ⌂ North Austin | |
|---|---|---|---|---|---|
| Ticket # | Type | Payment | Time | Total | |
| 07/03/2014 | | | | | |
| #AM571 | SALE | CASH | 01:41PM | $9.73 > | |
| 06/16/2014 | | | | | |
| #A69EH | REFUND 417290470 | CARD 8774 | 04:39pm | ($20.56) > | |
| #A66R5 | SALE 417290470 | CARD 8774 | 11:21pm | ($20.56) > | |
| 06/04/2014 | | | | | |
| #A1U3M | REFUND 413385295 | CARD 8774 | 10:07pm | ($29.22) > | Select Item to Review Ticket |
| #A1U34 | SALE 413385295 | CARD 8774 | 10:03pm | $29.22 > | |
| 06/03/2014 | | | | | |
| #A1VTK | REFUND 413042229 | CARD 9906 | 11:04pm | ($54.11) > | |
| #A1V0@ | SALE 413042229 | CARD 9906 | 10:54pm | $54.11 > | |
| 06/02/2014 | | | | | |
| #A1WNT | REFUND 412673884 | CARD 9906 | 01:01pm | ($21.64) > | |

*FIG. 19*

| < | | Sales | | ⌂ North Austin | |
|---|---|---|---|---|---|
| Ticket # | Type | Payment | Ti | Choose Location ⊗ | |
| 07/09/2014 | | | | All | |
| #A9337 | SALE | CASH | 10: | North Austin ✓<br>Current Location | |
| 07/03/2014 | | | | Round Rock Distribution... | |
| #AM571 | SALE | CASH | 01: | SoCo | |
| 06/16/2014 | | | | Mobile - Southend | |
| #A69EH | REFUND<br>417290470 | CARD<br>8774 | 04: | | Select Item to |
| #A66R5 | SALE<br>417290470 | CARD<br>8774 | 11: | | Review Ticket |
| 06/04/2014 | | | | | |
| #A1U3M | REFUND<br>413385295 | CARD<br>8774 | 10:07am | ($29.22) > | |
| #A1U34 | SALE<br>413385295 | CARD<br>8774 | 10:03am | $29.22 > | |
| 06/03/2014 | | | | | |
| #A1VTK | REFUND<br>413042229 | CARD<br>9906 | 11:04am | ($54.11) > | |
| #A1V0@ | SALE<br>413042229 | CARD<br>9906 | 10:54am | $54.11 > | |

*FIG. 21*

| | | Type: Day \| Week \| Month \| Quarter \| Year | | | | 🏠 North Austin |
|---|---|---|---|---|---|---|
| Total Sales | Card Sales | Cash Sales | Total Taxes | Total Refunds | Tax Refunds | Map |
| July 09, 2014 | | | | | | |
| $62.75 | $0.00 | $62.75 | $4.78 | $0.00 | $0.00 | 📍 |
| July 08, 2014 | | | | | | |
| $0.00 | $0.00 | $0.00 | $0.00 | $0.00 | $0.00 | |
| July 07, 2014 | | | | | | |
| $0.00 | $0.00 | $0.00 | $0.00 | $0.00 | $0.00 | |
| July 06, 2014 | | | | | | |
| $0.00 | $0.00 | $0.00 | $0.00 | $0.00 | $0.00 | |
| July 05, 2014 | | | | | | |
| $0.00 | $0.00 | $0.00 | $0.00 | $0.00 | $0.00 | |
| July 04, 2014 | | | | | | |
| $0.00 | $0.00 | $0.00 | $0.00 | $0.00 | $0.00 | |
| July 03, 2014 | | | | | | |
| $9.73 | $0.00 | $9.73 | $0.74 | $0.00 | $0.00 | 📍 |
| July 02, 2014 | | | | | | |

FIG. 27

| | | Type: Day Week Month Quarter Year | | | | 🏠 North Austin |
|---|---|---|---|---|---|---|
| Total Sales | Card Sales | Cash Sales | Total Taxes | Total Refunds | Tax Refunds | Map |
| July 06, 2014 | | | | | | |
| $0.00 | $0.00 | $62.75 | $0.00 | $0.00 | $0.00 | |
| June 29 – July 05, 2014 | | | | | | |
| $9.73 | $0.00 | $0.00 | $0.74 | $0.00 | $0.00 | ⦿ |
| June 22 – July 28, 2014 | | | | | | |
| $0.00 | $0.00 | $0.00 | $0.00 | $0.00 | $0.00 | |
| June 15 – July 21, 2014 | | | | | | |
| $20.56 | $20.56 | $0.00 | $1.57 | $20.56 | $1.57 | ⦿ |
| June 08 – July 14, 2014 | | | | | | |
| $0.00 | $0.00 | $0.00 | $0.00 | $0.00 | $0.00 | |
| June 01 – July 07, 2014 | | | | | | |
| $104.97 | $104.97 | $0.00 | $8.00 | $104.97 | $8.00 | ⦿ |
| May 25 – 31, 2014 | | | | | | |
| $91.95 | $0.00 | $19.47 | $7.01 | $57.35 | $4.37 | ⦿ |
| May 18 – 24, 2014 | | | | | | |

FIG. 28

| | | Type: | Day | Week | Month | Quarter | Year | | ⌂ North Austin |
|---|---|---|---|---|---|---|---|---|---|
| Total Sales | Card Sales | Cash Sales | | Total Taxes | | Total Refunds | | Tax Refunds | Map |
| July, 2014 | | | | | | | | | |
| $9.73 | $0.00 | $9.73 | | $0.74 | | $0.00 | | $0.00 | ⊙ |
| June, 2014 | | | | | | | | | |
| $125.53 | $125.53 | $0.00 | | $9.57 | | $125.53 | | $9.57 | ⊙ |
| May, 2014 | | | | | | | | | |
| $108.15 | $88.68 | $19.47 | | $7.01 | | $73.55 | | $5.60 | ⊙ |
| April, 2014 | | | | | | | | | |
| $5.14 | $0.00 | $5.14 | | $0.39 | | $0.00 | | $0.00 | ⊙ |
| March, 2014 | | | | | | | | | |
| $58.46 | $34.94 | $23.52 | | $1.67 | | $34.94 | | $0.24 | ⊙ |
| February 01 – 28, 2014 | | | | | | | | | |
| $3.52 | $3.52 | $0.00 | | $0.27 | | $0.00 | | $0.00 | ⊙ |

*FIG. 29*

| | | Type: | Day | Week | Month | Quarter | Year | | ⌂ North Austin |
|---|---|---|---|---|---|---|---|---|---|
| Total Sales | Card Sales | Cash Sales | | Total Taxes | | Total Refunds | | Tax Refunds | Map |
| July - September, 2014 | | | | | | | | | |
| $9.73 | $0.00 | $9.73 | | $0.74 | | $0.00 | | $0.00 | ⊙ |
| April - June, 2014 | | | | | | | | | |
| $238.82 | $214.21 | $24.61 | | $16.97 | | $199.08 | | $15.17 | ⊙ |
| January - March, 2014 | | | | | | | | | |
| $61.98 | $38.46 | $23.52 | | $1.94 | | $34.94 | | $0.24 | ⊙ |

*FIG. 30*

| < | 📈 ≡ | Type: | Day | Week | Month | Quarter | Year | | 🏠 North Austin |
|---|---|---|---|---|---|---|---|---|---|
| Total Sales | Card Sales | Cash Sales | Total Taxes | Total Refunds | Tax Refunds | Map |
| 2014 | | | | | | |
| $310.53 | $252.67 | $57.86 | $19.65 | $234.02 | $15.41 | 📍 |

FIG. 31

| < Done | Inventory | | | 🏠 North Austin | Basic Tee |
|---|---|---|---|---|---|
| Product | Quantity | Reorder Level | Reorder Quantity | Counted On | Stock at: North Austin |
| 👕 Basic Tee | 14 | 5 | 10 | 06/02/14 ● | Quantity  −  14  +   ↻ 06/02/14 |
| 🩳 Cargo Shorts | 30 | 10 | 10 | 06/02/14 | Pending Orders                    0 |
| 🏷 Dress Shirt | 6 | 5 | 5 | 06/02/14 | Reorder Level                    [ 5 ] |
| 👔 Dri-Fit Knit | 22 | 0 | 0 | 06/02/14 | Reorder Quantity              [ 10 ] |
| 🖐 Foam Finger | 31 | 10 | 10 | 06/02/14 | Price at Location           [ $17.99 ] |
| 🪑 Folding Chair | 12 | 0 | 0 | 06/02/14 | Tags                                [ tags ] |
| 🏈 Football | 31 | 0 | 0 | 06/02/14 | ⊕ adjust    ⊕ order    ⊕ transfer |
| 🧙 Garden Gnome | 15 | 0 | 0 | 06/02/14 | ⊗                    Choose Reason |
| 👕 Golf Polo | 3 | 0 | 0 | 06/02/14 |               Quantity: [ 0 ] |
| 👟 House Slippers | 14 | 0 | 0 | 06/02/14 | |
| ✒ Ink Pen | 6 | 0 | 0 | 05/20/14 | |
| 🔑 Key Chain | 13 | 0 | 0 | 06/02/14 | |
| 👛 Leather Wallet | 3 | 5 | 10 | 06/02/14 | |

FIG. 32

| < Done | Inventory | | | ⌂ North Austin | Basic Tee |
|---|---|---|---|---|---|
| Product | Quantity | Reorder Level | Reorder Quantity | Counted On | Stock at: North Austin |
| 🎽 Basic Tee | 14 | 5 | 10 | 06/02/14 ● | Quantity − 14 + ↻ |
| 🩳 Cargo Shorts | 30 | 10 | 10 | 06/02/14 | 06/02/14 |
| 👔 Dress Shirt | 6 | 5 | 5 | 06/02/14 | Pending Orders 0 |
| 👕 Dri-Fit Knit | 22 | 0 | 0 | 06/02/14 | Reorder Level [ 5 ] |
| 👆 Foam Finger | 31 | 10 | 10 | 06/02/14 | Reorder Quantity [ 10 ] |
| 🪑 Folding Chair | 12 | 0 | 0 | 06/02/14 | Price at Location [ $17.99 ] |
| 🏈 Football | 31 | 0 | 0 | 06/02/14 | Tags [ tags ] |
| 🧙 Garden Gnome | 15 | 0 | 0 | 06/02/14 | ⊕ adjust  ⊕ order  ⊕ transfer |
| 👕 Golf Polo | 3 | 0 | 0 | 06/02/14 | T-Shirt → North Austin |
| 🥿 House Slippers | 14 | 0 | 0 | 06/02/14 | ⊗  Quantity: [ 10 ] |
| 🖊 Ink Pen | 6 | 0 | 0 | 05/20/14 | |
| 🔑 Key Chain | 13 | 0 | 0 | 06/02/14 | |
| 👛 Leather Wallet | 3 | 5 | 10 | 06/02/14 | |

FIG. 33

| < Done            Pay With Cash | Sales Ticket |
|---|---|
| Summary | Tax Location: North Austin    Tax Rate: 8.25% |
| Subtotal Before tax         $57.97 | 👕 ①Basic Tee              $17.99 |
| Discount                     $0.00 | 🧦 ①Socks                  $4.99 |
| Tax                          $4.78 | 🩳 ①Cargo Shorts          $34.99 |
| Total                    $62.75 | |
| Change | |
| Cash  [$62.75] [$63.00] [$65.00] [$70.00] [$0.00] | |
| Change                  -$62.75 | |
| | Total:                    $62.75 |
| | Cancel |

METHODS AND APPARATUS FOR UNIFIED INVENTORY AND FINANCIAL TRANSACTION MANAGEMENT

CLAIM TO PRIORITY

This application is a continuation of and claims the benefit of priority to U.S. application Ser. No. 17/101,899, filed Nov. 23, 2020, which is a continuation of and claims the benefit of priority to U.S. application Ser. No. 16/156,101, filed Oct. 10, 2018, (now U.S. Pat. No. 10,878,393, issued Dec. 29, 2020), which is a continuation of and claims the benefit of priority to U.S. application Ser. No. 14/808,383, filed Jul. 24, 2015 (now U.S. Pat. No. 10,115,095, issued Oct. 30, 2018), which claims benefit of priority to U.S. Provisional Application No. 62/028,763, filed Jul. 24, 2014, U.S. Provisional Application No. 62/028,933, filed Jul. 25, 2014, U.S. Provisional Application No. 62/030,335, filed Jul. 29, 2014, and U.S. Provisional Application No. 62/081,329, filed Nov. 18, 2014, the entireties of which are incorporated herein by reference.

BACKGROUND

Description of the Related Art

Electronic commerce, colloquially known as e-commerce or e-business, includes the buying and selling of products or services over electronic systems such as the Internet and other computer networks. While a significant percentage of the growth in e-commerce in recent years has involved virtual goods and services, most electronic commerce still frequently involves fulfillment of an order through the transportation of physical items in some way and an accompanying financial transaction. In the majority of e-commerce transactions, the purchase transaction is ordered or agreed electronically and interactively in real-time and subsequently completed with the delivery of a physical package containing goods.

The amount of trade conducted electronically has grown rapidly with widespread Internet usage and has further increased with the proliferation of mobile computing devices capable of accessing the Internet. Such mobile computing devices include laptop computers, tablet computers, and handheld telephones.

In today's environment, however, merchants have separate payment processors for their ecommerce, retail stores and mobile sales channels creating silos of information and disjointed customer experiences. There are significant technology roadblocks in the journey to omnichannel commerce. These roadblocks, or friction points, can hamper a merchant's ability to deploy new sales channels; reach new and existing customers with relevant, effective promotions and offers; and ultimately expand their businesses. In other words, these friction points can prevent a business from operating smoothly and reaching its full potential.

These friction points include finding a single payment service provider to process payments across multiple channels. Today, many merchants must rely on separate payments providers for their in-store, e-commerce and mobile sales.

These friction points include managing product inventory across all channels of commerce.

SUMMARY

Some embodiments provide a multi-channel (eCommerce, In Store and Mobile) payment processing platform with integrated inventory management and business intelligence providing merchants a single platform to accept payments, track and manage inventory and gain valuable insights into their business performance.

Various embodiments of methods and apparatus for unified inventory and financial transaction management are disclosed. Some embodiments include a system for unified inventory and financial transaction management. In some embodiments, the system includes a processor and program instructions computer-executable to implement a system for providing payment processing services from a plurality of disparate payment processors to a plurality of disparate transaction intake platforms. In some embodiments, the system includes one or more computers configured to implement by executing instructions on one or more processors a platform-agnostic transaction-related communication system. In some embodiments, the transaction-related communication system includes one or more receiving modules for receiving a first item of financial transaction information from a customer-facing interface, and receiving a second item of financial transaction information from a merchant-facing point-of-sale interface.

In some embodiments, the transaction-related communication system includes a point of sale server for rendering in a common internal format the first item of financial transaction information from the customer-facing interface, and rendering in the common internal format the second item of financial transaction information from the merchant-facing point-of-sale interface. In some embodiments, the transaction-related communication system includes a payment processing module for rendering in a second format the first item of financial transaction information for payment processing by a first external financial party, and rendering in a third format the first item of financial transaction information for payment processing by a second external financial party.

In some embodiments, the transaction-related communication system includes a transaction execution module for transmitting in the second format the first item of financial transaction information for payment processing by the first external financial party, and transmitting in the third format the second item of financial transaction information for payment processing by the second external financial party.

BRIEF DESCRIPTION OF THE DRAWINGS

FIG. 19 is a user interface for selecting for review a sales ticket for unified inventory and financial transaction management, according to some embodiments.

FIG. 21 is a user interface for selecting for review an item in a sales ticket for unified inventory and financial transaction management, according to some embodiments.

FIG. 27 is a user interface for reviewing an overview of transactions in a system for unified inventory and financial transaction management, according to some embodiments.

FIG. 28 is a user interface for reviewing an overview of transactions in a system for unified inventory and financial transaction management, according to some embodiments.

FIG. 29 is a user interface for reviewing an overview of transactions in a system for unified inventory and financial transaction management, according to some embodiments.

FIG. 30 is a user interface for reviewing an overview of transactions in a system for unified inventory and financial transaction management, according to some embodiments.

FIG. 31 is a user interface for reviewing an overview of transactions in a system for unified inventory and financial transaction management, according to some embodiments.

FIG. 32 is a user interface for reviewing an overview of inventory in a system for unified inventory and financial transaction management, according to some embodiments.

FIG. 33 is a user interface for reviewing an overview of transactions in a system for unified inventory and financial transaction management, according to some embodiments.

FIG. 34 is a user interface for recording a transaction in a system for unified inventory and financial transaction management, according to some embodiments.

FIG. 35 is a user interface for reporting a transaction in a system for unified inventory and financial transaction management, according to some embodiments.

Figure 1:
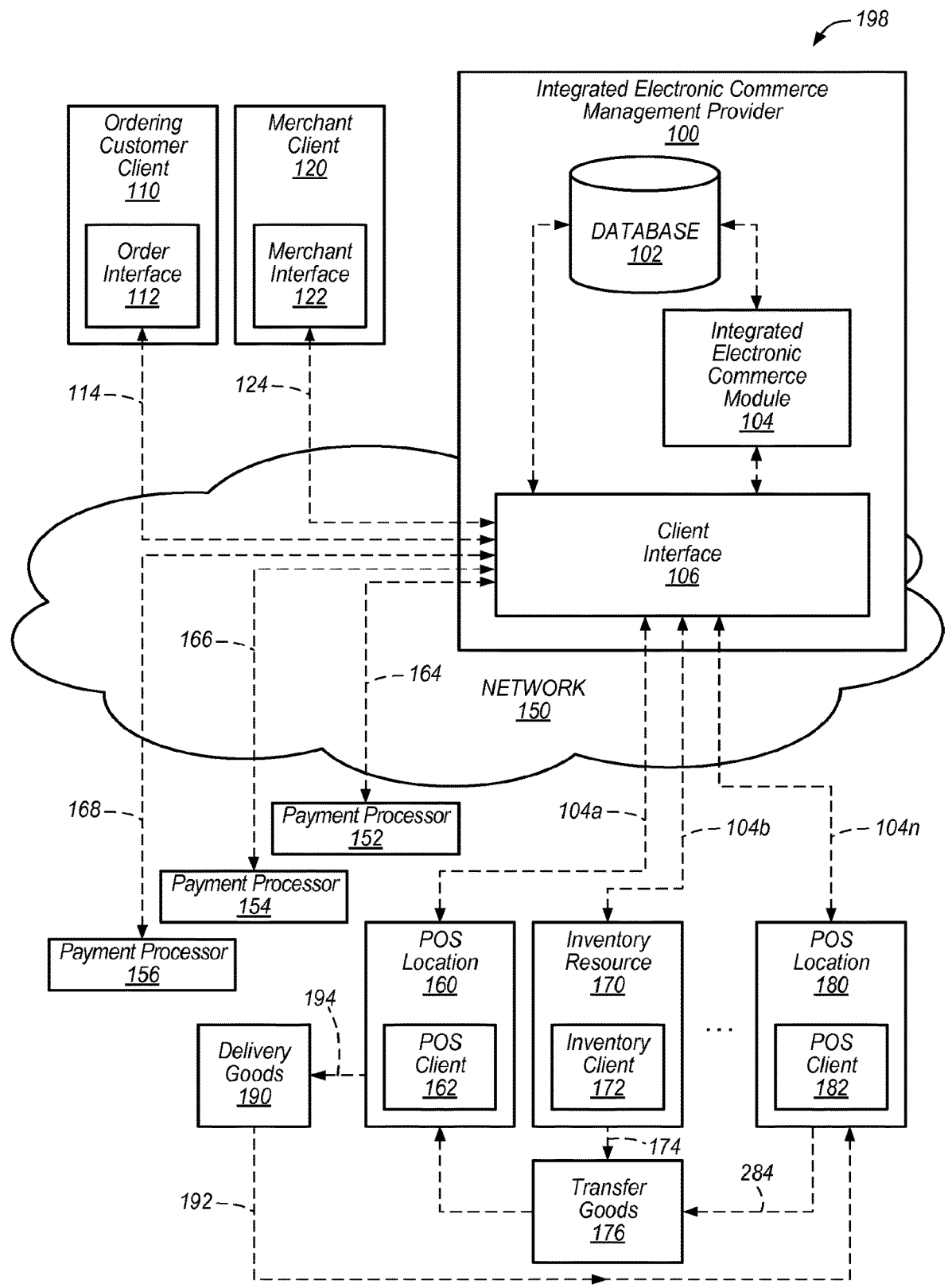
FIG. 1 illustrates a distributed system that may implement unified inventory and financial transaction management, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Brief Introduction to Electronic Commerce Management for Customized Products

Some embodiments include a system for unified inventory and financial transaction management. Some embodiments reduce the complications and unnecessary costs of managing payments partnerships across multiple channels that bring friction into a merchant's business and present artificial barriers to success. In some embodiments, a system for unified inventory and financial transaction management reduces friction caused by disparate processing rates, extra reconciliation paperwork and misaligned inventory by providing an all-in-one payments solution capable, in some embodiments, of receiving data from multiple customer touchpoints across multiple ones of a merchant's channels.

In some embodiments, friction points can be eliminated with the implementation of a system for unified inventory and financial transaction management in multiple channels. Some embodiments of a system for unified inventory and financial transaction management accept mobile, online and point-of-sale payments under a single merchant account, providing room scaling that allows merchants to take advantage of new opportunities for expansion and growth.

Some embodiments of a system for unified inventory and financial transaction management support a merchant that operates a physical store, operates an online store, accepts payments on a mobile device, or any combination of those channels. Some embodiments of a system for unified inventory and financial transaction management present a single merchant account to reduce reconciliation and accounting headaches and to provide one version of the data through consolidated reports across all channels and touchpoints. Some embodiments of a system for unified inventory and financial transaction management can also handle the issues of managing inventory across mobile and e-commerce touchpoints, as well as in the store, providing a single view of the merchandise that's available to sell, and helping businesses balance between inventory and demand.

Some embodiments of a system for unified inventory and financial transaction management support a cloud-based point-of-sale, mobile and eCommerce framework that integrates payments with inventory management.

Some embodiments of a system for unified inventory and financial transaction management real-time, in-app inventory tracking, management and replenishment directly from a mobile application. Some embodiments of a system for unified inventory and financial transaction management provide import and export capabilities that allow merchants to easily transfer and integrate inventory data into other systems. Some embodiments of a system for unified inventory and financial transaction management provide Integration with third party eCommerce platforms—sales and inventory data by location provides merchants more valuable insights into their business. Some embodiments of a system for unified inventory and financial transaction management provide the ability to set replenishment thresholds and alerts and transfer inventory between locations and channels. Some embodiments of a system for unified inventory and financial transaction management adjust inventory for sales and returns in real-time and can also work with a merchant's existing inventory platform, by allowing merchants to integrate in to some embodiments of a system for unified inventory and financial transaction management using application program interfaces.

Some embodiments of a system for unified inventory and financial transaction management can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of a system for unified inventory and financial transaction management provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of a system for unified inventory and financial transaction management also allow developers to integrate payments, inventory and business insights into their platforms through the only single stack of application program interfaces for card present and card not present transactions.

In some embodiments, the system includes a processor and program instructions computer-executable to implement a system for providing payment processing services from a plurality of disparate payment processors to a plurality of disparate transaction intake platforms. In some embodiments, the system includes one or more computers configured to implement by executing instructions on one or more processors a platform-agnostic transaction-related communication system. In some embodiments, the transaction-related communication system includes one or more receiving modules for receiving a first item of financial transaction information from a customer-facing interface, and receiving a second item of financial transaction information from a merchant-facing point-of-sale interface.

In some embodiments, the transaction-related communication system includes a point of sale server for rendering in a common internal format the first item of financial transaction information from the customer-facing interface, and rendering in the common internal format the second item of financial transaction information from the merchant-facing point-of-sale interface. In some embodiments, the transaction-related communication system includes a payment processing module for rendering in a second format the first item of financial transaction information for payment processing by a first external financial party, and rendering in a third format the first item of financial transaction information for payment processing by a second external financial party.

In some embodiments, the transaction-related communication system includes a transaction execution module for transmitting in the second format the first item of financial transaction information for payment processing by the first external financial party, and transmitting in the third format the second item of financial transaction information for payment processing by the second external financial party.

In some embodiments, the system supports providing payment processing services from a plurality of disparate payment processors to a plurality of disparate transaction intake platforms. In some embodiments, the common internal format is a common intake transaction ticket format. In some embodiments, the one or more receiving modules include a single stack application program interface residing on one of the one or more servers. In some embodiments, the receiving the first item of financial transaction information from the customer-facing interface further includes receiving in the common intake transaction ticket format over the network from a mobile computing device the first item of financial transaction information from the customer-facing interface. In some embodiments, the receiving the second item of financial transaction information from the merchant-facing point-of-sale interface further includes receiving over the network in the common intake transaction ticket format the second item of financial transaction information from the merchant-facing point-of-sale interface.

In some embodiments, the common internal format is a common intake transaction ticket format. In some embodiments, the system further includes a first translation module on a mobile computing device for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules include a single stack application program interface residing on one of the one or more servers. In some embodiments, the server communicates remotely with the mobile computing device over a wireless network. In some embodiments, the server communicates remotely with the merchant-facing point of sale device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module is further configured for receiving on the one or more servers a transaction authorization confirmation from the first external financial party, and the point of sale server is further configured for transmitting to the customer-facing interface an indication of the transaction authorization confirmation. In some embodiments, the payment processing module includes a payment processing gateway for communicating with servers of external financial processors using encrypted links over a network.

In some embodiments, the system for providing payment processing services from a plurality of disparate payment processors to a plurality of disparate transaction intake platforms further includes a business intelligence analytics module for providing business intelligence based at least in part on the first item of financial transaction information.

In some embodiments, the system for providing payment processing services from a plurality of disparate payment processors to a plurality of disparate transaction intake platforms further includes an inventory coordination module for providing transaction fulfillment information based at least in part on the first item of financial transaction information.

Some embodiments include a method for providing payment processing services from a plurality of disparate payment processors to a plurality of disparate transaction intake platforms. In some embodiments, the method includes causing modules, implemented as hardware, software, or a combination of hardware and software on one or more computers executing instructions on one or more processors to implement a platform-agnostic transaction-related communication system that performs a method including receiving a first item of financial transaction information from a customer-facing interface and receiving a second item of financial transaction information from a merchant-facing point-of-sale interface.

In some embodiments, the method includes rendering in a common internal format the first item of financial transaction information from the customer-facing interface. In some embodiments, the method includes rendering in the common internal format the second item of financial transaction information from the merchant-facing point-of-sale interface. In some embodiments, the method includes rendering in a second format the first item of financial transaction information for payment processing by a first external financial party. In some embodiments, the method includes rendering in a third format the first item of financial transaction information for payment processing by a second external financial party.

In some embodiments, the method includes transmitting in the second format the first item of financial transaction information for payment processing by the first external financial party. In some embodiments, the method includes transmitting in the third format the second item of financial transaction information for payment processing by the second external financial party.

In some embodiments, the method includes providing payment processing services from a plurality of disparate payment processors to a plurality of disparate transaction intake platforms. In some embodiments, the common internal format is a common intake transaction ticket format.

In some embodiments, the receiving the first item of financial transaction information from the customer-facing interface further includes receiving in the common intake transaction ticket format over the network from a mobile computing device the first item of financial transaction information from the customer-facing interface. In some embodiments, the receiving the second item of financial transaction information from the merchant-facing point-of-sale interface further includes receiving over the network in the common intake transaction ticket format the second item of financial transaction information from the merchant-facing point-of-sale interface.

In some embodiments, the common internal format is a common intake transaction ticket format, and the method further includes receiving from a customer facing application including the customer-facing interface on the mobile computing device the first item of financial transaction information. In some embodiments, the common internal format is a common intake transaction ticket format, and the method further includes translating to a common intake transaction ticket format the first item of financial transaction information. In some embodiments, the common internal format is a common intake transaction ticket format, and the method further includes receiving from a merchant facing application including the merchant-facing point-of-sale interface on a merchant point of sale device the second item of financial transaction information. In some embodiments, the common internal format is a common intake transaction ticket format, and the method further includes translating to the common intake transaction ticket format the second item of financial transaction information.

In some embodiments, the receiving the first item of financial transaction information from the customer-facing interface further includes receiving in the common intake transaction ticket format at a single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the method further includes receiving on the one or more servers a transaction authorization confirmation from the first external financial party, and transmitting to the customer-facing interface an indication of the transaction authorization confirmation. In some embodiments, the method further includes a payment processing gateway communicating with servers of external financial processors using encrypted links over a network. In some embodiments, the method further includes a business intelligence analytics module providing business intelligence based at least in part on the first item of financial transaction information.

In some embodiments, the method further includes an inventory coordination module providing transaction fulfillment information based at least in part on the first item of financial transaction information.

Some embodiments include a non-transitory computer-readable storage medium storing program instructions for providing payment processing services from a plurality of disparate payment processors to a plurality of disparate transaction intake platforms. In some embodiments, the program instructions are computer-executable to implement receiving a first item of financial transaction information from a customer-facing interface. In some embodiments, the program instructions are computer-executable to implement receiving a second item of financial transaction information from a merchant-facing point-of-sale interface. In some embodiments, the program instructions are computer-executable to implement rendering in a common internal format the first item of financial transaction information from the customer-facing interface. In some embodiments, the program instructions are computer-executable to implement rendering in the common internal format the second item of financial transaction information from the merchant-facing point-of-sale interface.

In some embodiments, the program instructions are computer-executable to implement transmitting in the second format the first item of financial transaction information for payment processing by the first external financial party. In some embodiments, the program instructions are computer-executable to implement transmitting in the third format the second item of financial transaction information for payment processing by the second external financial party.

In some embodiments, the common internal format is a common intake transaction ticket format. In some embodiments, the program instructions computer-executable to implement receiving the first item of financial transaction information from the customer-facing interface further include program instructions computer-executable to implement receiving in the common intake transaction ticket format over the network from a mobile computing device the first item of financial transaction information from the customer-facing interface. In some embodiments, the program instructions computer-executable to implement receiving the second item of financial transaction information from the merchant-facing point-of-sale interface further include program instructions computer-executable to implement receiving over the network in the common intake transaction ticket format the second item of financial transaction information from the merchant-facing point-of-sale interface.

In some embodiments, the common internal format is a common intake transaction ticket format. In some embodiments, the program instructions computer-executable for providing payment processing services further include program instructions computer-executable to implement receiving from a customer facing application including the customer-facing interface on the mobile computing device the first item of financial transaction information. In some embodiments, the program instructions computer-executable for providing payment processing services further include program instructions computer-executable to implement translating to a common intake transaction ticket format the first item of financial transaction information. In some embodiments, the program instructions for providing payment processing services further include program instructions computer-executable to implement receiving from a merchant facing application including the merchant-facing point-of-sale interface on a merchant point of sale device the second item of financial transaction information. In some embodiments, the program instructions for providing payment processing services further include program instructions computer-executable to implement translating to the common intake transaction ticket format the second item of financial transaction information.

In some embodiments, the one or more receiving modules include a single stack application program interface residing on one of the one or more servers. In some embodiments, the program instructions computer-executable to implement receiving the first item of financial transaction information from the customer-facing interface further include program instructions computer-executable to implement receiving in the common intake transaction ticket format at the single stack application interface from the mobile computing device the first item of financial transaction information from the customer-facing interface. In some embodiments, the program instructions computer-executable to implement receiving the second item of financial transaction information from the merchant-facing point-of-sale interface further include program instructions computer-executable to implement receiving in the common intake transaction ticket format at the single stack application interface the second item of financial transaction information from the merchant-facing point-of-sale interface.

In some embodiments, the program instructions for providing payment processing services further include program instructions computer-executable to implement receiving on the one or more servers a transaction authorization confirmation from the first external financial party, and program instructions computer-executable to implement transmitting to the customer-facing interface an indication of the transaction authorization confirmation. In some embodiments, the program instructions for providing payment processing services further include program instructions computer-executable to implement further include program instructions computer-executable to implement a payment processing gateway for communicating with servers of external financial processors using encrypted links over a network.

In some embodiments, the program instructions for providing payment processing services further include program instructions computer-executable to implement program instructions computer-executable to implement a business intelligence analytics module for providing business intelligence based at least in part on the first item of financial transaction information. In some embodiments, the program instructions for providing payment processing services further include program instructions computer-executable to implement program instructions computer-executable to implement an inventory coordination module for transaction fulfillment information based at least in part on the first item of financial transaction information.

Example Implementations

FIG. 1 illustrates a distributed system that may implement unified inventory and financial transaction management, according to some embodiments. An integrated electronic commerce management provider 100 manages a system 198 for providing payment processing services from a plurality of disparate payment processors 152-156 to a plurality of disparate transaction intake platforms 110 and 120. Integrated electronic commerce management provider 100 includes, in some embodiments, a database 102 storing electronic commerce inventory and transaction records in a common internal format. Integrated electronic commerce management provider 100 includes, in some embodiments, an integrated electronic commerce module 104 for implementing platform-agnostic transaction-related communication across a client interface 106. An ordering customer client 110, a merchant client 120, payment processors 152-156, a point of sale location 160, an inventory resource 170, and another point of sale location 180 communicate across network 150 with integrated electronic commerce module 104 to implement platform-agnostic transaction-related communication using client interface 106.

On ordering customer client 110, a customer-facing order interface 112 transmits and receives transaction information (in some embodiments either or both financial and inventory) as communications 114 with client interface 106 over network 150. On merchant client 120, a merchant interface 122 transmits and receives transaction information (in some embodiments either or both financial and inventory) as communications 124 with client interface 106 over network 150. Payment processors 152-156 transmit and receive transaction communications 164-168 with client interface 106 over network 150.

In some embodiments, inventory transactions can be reported by or ordered by transaction communication 104a-104n over network 150 to point of sale client 162, inventory client 172, and point of sale client 182. In some embodiments, inventory transactions involve the delivery 194 or return 192 of delivery goods 190. Likewise, inventory transactions involve the transfer 184 from a first point of sale location 180 to a second point of sale location 160 or the transfer 174 from an inventory resource 170 to a point of sale location 160.

In some embodiments, the system 198 includes one or more computers, such as will be discussed below with respect to FIG. 36, configured to implement by executing instructions on one or more processors a platform-agnostic transaction-related communication system. In some embodiments, the transaction-related communication system includes one or more receiving modules, which can, in some example embodiments, be located in ordering customer client 110, merchant client 120, or integrated electronic commerce module 104, for receiving a first item of financial transaction information from a customer-facing interface (for example, in some embodiments order interface 112), and receiving a second item of financial transaction information from a merchant-facing point-of-sale interface (for example, in some embodiments merchant interface 122). As one of skill in the art will readily comprehend in light of having read the present disclosure, any function described as having been performed by a module or interface of the present disclosure can be performed by another interface or module of the present disclosure without departing from the scope and intent of the present disclosure.

In some embodiments, the transaction-related communication system includes a point of sale server (for example, in some embodiments located in ordering customer client 110) for rendering in a common internal format the first item of financial transaction information from the customer-facing interface (for example, in some embodiments order interface 112), and rendering in the common internal format the second item of financial transaction information from the merchant-facing point-of-sale interface (for example, in some embodiments merchant interface 122). In some embodiments, the transaction-related communication system includes a payment processing module (for example, in some embodiments, contained within integrated electronic commerce module 104), for rendering in a second format the first item of financial transaction information for payment processing by a first external financial party (for example, in some embodiments payment processor 152), and rendering in a third format the first item of financial transaction information for payment processing by a second external financial party (for example, in some embodiments payment processor 154).

In some embodiments, the transaction-related communication system includes a transaction execution module (for example, in some embodiments, contained within integrated electronic commerce module 104), for transmitting in the second format the first item of financial transaction information for payment processing by the first external financial party (for example, in some embodiments payment processor 152), and transmitting in the third format the second item of financial transaction information for payment processing by the second external financial party (for example, in some embodiments payment processor 154).

In some embodiments, the system provides payment processing services from a plurality of disparate payment processors (for example, in some embodiments, payment processors 154-156) to a plurality of disparate transaction intake platforms (for example, in some embodiments ordering customer client 110 and merchant client 120). In some embodiments, the common internal format is a common intake transaction ticket format. In some embodiments, the one or more receiving modules include a single stack application program interface residing on one of the one or more servers (for example, in some embodiments as a part of client interface 106). In some embodiments, the receiving the first item of financial transaction information from the customer-facing interface (for example, in some embodiments order interface 112) further includes receiving in the common intake transaction ticket format over the network from a mobile computing device (for example, in some embodiments ordering client 110) the first item of financial transaction information from the customer-facing interface (for example, in some embodiments order interface 112). In some embodiments, the receiving the second item of financial transaction information from the merchant-facing point-of-sale interface (for example, in some embodiments merchant interface 122) further includes receiving over the network in the common intake transaction ticket format the second item of financial transaction information from the merchant-facing point-of-sale interface (for example, in some embodiments merchant client 120).

In some embodiments, the common internal format is a common intake transaction ticket format. In some embodiments, the system further includes a first translation module on a mobile computing device (for example, in some embodiments ordering customer client 120) for receiving from a customer facing application including the customer-facing interface (for example, in some embodiments order interface 112) on the mobile computing device the first item of financial transaction information, and translating to a common intake transaction ticket format the first item of financial transaction information. In some embodiments, the system further includes a second translation module on a merchant-facing point of sale device (for example, in some embodiments merchant client 120) for receiving from a merchant facing application (for example, in some embodiments merchant interface 122) including the merchant-facing point-of-sale interface on a merchant point of sale device the second item of financial transaction information, and translating to the common intake transaction ticket format the second item of financial transaction information.

In some embodiments, the one or more receiving modules include a single stack application program interface residing on one of the one or more servers (for example, in some embodiments in client interface 112). In some embodiments, the server (for example, in some embodiments integrated electronic commerce module 104) communicates (for example, in some embodiments sending and receiving communications 114) remotely with the mobile computing device (for example, in some embodiments customer ordering client 110) over a wireless network (for example, in some embodiments network 150). In some embodiments, the server (for example, in some embodiments integrated electronic commerce module 104) communicates remotely with the merchant-facing point of sale device over a second network. In some embodiments, the receiving the first item of financial transaction information from the customer-facing interface (for example, in some embodiments in order interface 112) further includes receiving in the common intake transaction ticket format at the single stack application interface (for example, in some embodiments in client interface 106) from the mobile computing device the first item of financial transaction information from the customer-facing interface (for example, in some embodiments in ordering interface 112). In some embodiments, the receiving the second item of financial transaction information from the merchant-facing point-of-sale interface further includes receiving in the common intake transaction ticket format at the single stack application interface (for example, in some embodiments in client interface 106) the second item of financial transaction information from the merchant-facing point-of-sale interface (for example, in some embodiments merchant interface 122).

In some embodiments, the transaction execution module (for example, in some embodiments in integrated electronic commerce module 104) is further configured for receiving on the one or more servers a transaction authorization confirmation from the first external financial party, and the point of sale server (for example, in some embodiments in integrated electronic commerce module 104) is further configured for transmitting to the customer-facing interface (for example, in some embodiments order interface 112) an indication of the transaction authorization confirmation. In some embodiments, the payment processing module includes a payment processing gateway (for example, in some embodiments in client interface 106) for communicating with servers of external financial processors (for example, in some embodiments payment processors 152-156) using encrypted links over a network 150.

In some embodiments, the system for providing payment processing services from a plurality of disparate payment processors (for example, in some embodiments payment processors 152-156) to a plurality of disparate transaction intake platforms further includes a business intelligence analytics module (for example, in some embodiments in integrated electronic commerce module 104) for providing business intelligence based at least in part on the first item of financial transaction information.

In some embodiments, the system for providing payment processing services from a plurality of disparate payment processors (for example, in some embodiments payment processors 152-156) to a plurality of disparate transaction intake platforms (for example, in some embodiments merchant client 120 and ordering customer client 110) further includes an inventory coordination module (for example, in some embodiments in integrated electronic commerce module 104) for providing transaction fulfillment information based at least in part on the first item of financial transaction information.

In some embodiments, the inventory coordination module enables the integrated electronic commerce module 104 to monitor consolidated stock levels and determine when to re-order, without relying on additional systems or manual reporting, thereby enabling merchants to provide a consistent, seamless experience for consumers across all channels, including offering returns through any channel no matter where the purchase originated. Some embodiments of integrated electronic commerce module 104 support a merchant that operates a physical store, operates an online store, accepts payments on a mobile device, or any combination of those channels. Some embodiments of integrated electronic commerce module 104 present a single merchant account to reduce reconciliation and accounting headaches and to provide one version of the data through consolidated reports across all channels and touchpoints. Some embodiments of integrated electronic commerce module 104 can also handle the issues of managing inventory across mobile and e-commerce touchpoints, as well as in the store, providing a single view of the merchandise that's available to sell, and helping businesses balance between inventory and demand.

Some embodiments of integrated electronic commerce module 104 support a cloud-based point-of-sale, mobile and eCommerce framework that integrates payments with inventory management.

Some embodiments of integrated electronic commerce module 104 real-time, in-app inventory tracking, management and replenishment directly from a mobile application. Some embodiments of integrated electronic commerce module 104 provide import and export capabilities that allow merchants to easily transfer and integrate inventory data into other systems. Some embodiments of integrated electronic commerce module 104 provide Integration with third party eCommerce platforms—sales and inventory data by location provides merchants more valuable insights into their business. Some embodiments of integrated electronic commerce module 104 provide the ability to set replenishment thresholds and alerts and transfer inventory between locations and channels. Some embodiments of integrated electronic commerce module 104 adjust inventory for sales and returns in real-time and can also work with a merchant's existing inventory platform, by allowing merchants to integrate in to some embodiments of integrated electronic commerce module 104 using application program interfaces.

Some embodiments of integrated electronic commerce module 104 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of integrated electronic commerce module 104 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of integrated electronic commerce module 104 also allow developers to integrate payments, inventory and business insights into their platforms through the only single stack of application program interfaces for card present and card not present transactions.

Figure 2:
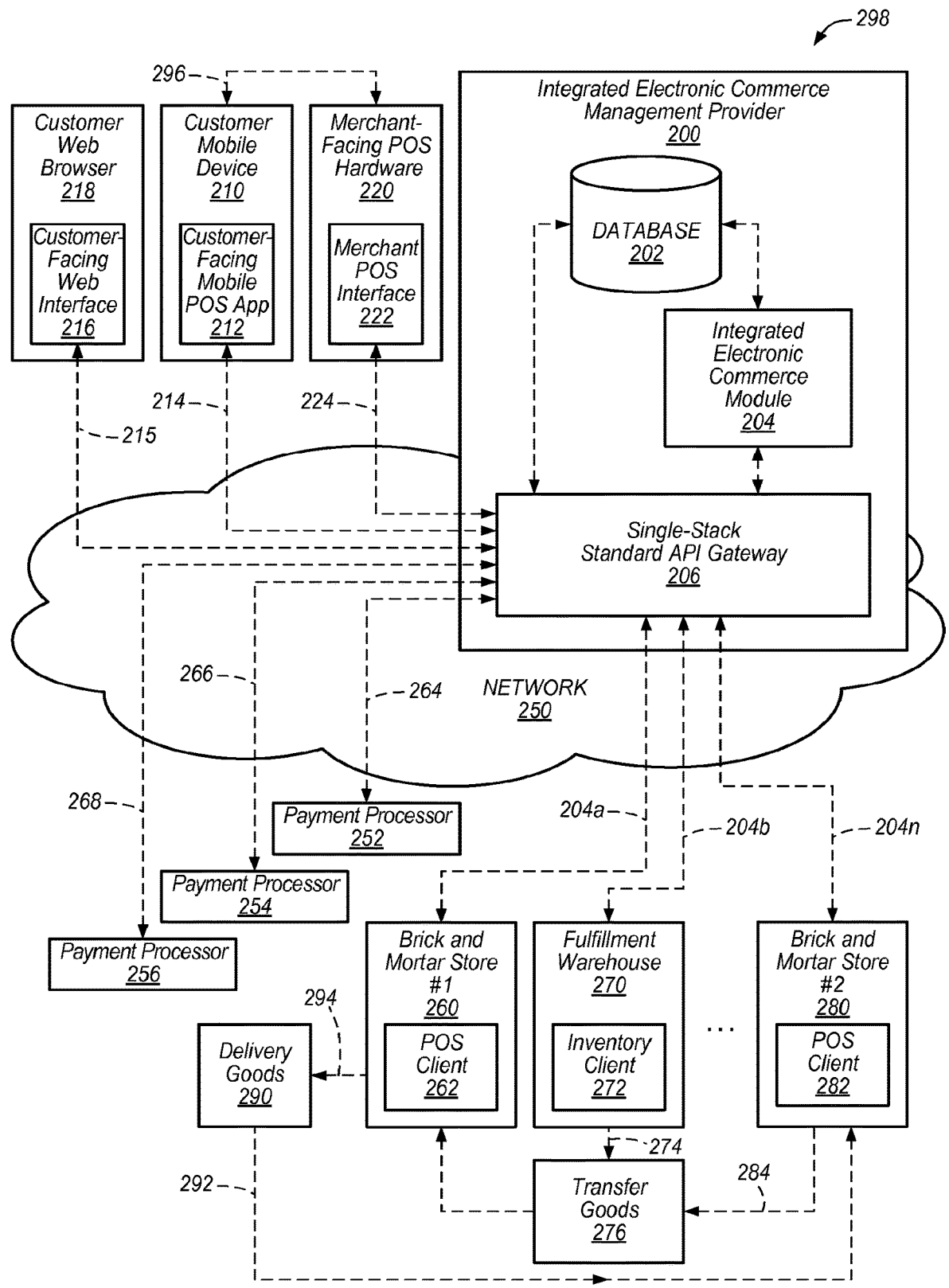
FIG. 2 depicts a distributed system that may implement unified inventory and financial transaction management, according to some embodiments.

FIG. 2 depicts a distributed system that may implement unified inventory and financial transaction management, according to some embodiments. An integrated electronic commerce management provider 200 hosts a system 298 for providing payment processing services from a plurality of disparate payment processors 252-256 to a plurality of disparate transaction intake platforms 218, 210 and 220. Integrated electronic commerce management provider 200 includes, in some embodiments, a database 202 storing electronic commerce inventory and transaction records in a common internal format. Integrated electronic commerce management provider 200 includes, in some embodiments, an integrated electronic commerce module 204 for implementing platform-agnostic transaction-related communication across a single-stack standard application program interface gateway 206. An ordering customer client embodied in the form of a customer mobile device 210, a merchant client embodied in the form of a cash register or other form of merchant-facing point of sale hardware 220, a customer web browser 218, payment processors 252-256, a point of sale location embodied as a brick-and-mortar store 260, an inventory resource embodied as a fulfillment warehouse 270, and another point of sale location embodied as a brick-and-mortar store 280 communicate across network 250 with integrated electronic commerce module 204 to implement platform-agnostic transaction-related communication using single-stack standard application program interface gateway 206.

On customer mobile device 210, a customer-facing an order interface embodied as a customer-facing mobile point of sale application 212 undertakes transaction communications 214 with single-stack standard application program interface gateway 206 over network 250. On customer web browser 218 (e.g., executing on a desktop PC), a customer-facing an order interface embodied as a customer-facing web interface 216 undertakes transaction communications 215 with single-stack standard application program interface gateway 206 over network 250. On merchant-facing point-of-sale hardware client 220, a merchant point of sale interface 222 undertakes transaction communications 224 with single-stack standard application program interface gateway 206 over network 250. Payment processors 252-256 undertake transaction communications 264-268 with single-stack standard application program interface gateway 206 over network 250. In some embodiments, wireless transaction communications 296 are undertaken between customer mobile device 210 and merchant-facing point of sale hardware 220 to automate creation of transactions.

In some embodiments, inventory transactions can be reported by or ordered by transaction communication 204a-204n over network 250 to point of sale client 262, inventory client 272, and point of sale client 282. In some embodiments, inventory transactions involve the delivery 294 or return 292 of delivery goods 290. Likewise, inventory transactions involve the transfer 284 from a first point of sale location in the form of second brick and mortar store 280 to a second point of sale location in the form of first brick and mortar store 260 or the transfer 274 from an inventory resource in the form of fulfillment warehouse 270 to a point of sale location in the form of first brick and mortar store 260.

In some embodiments, the system 298 includes one or more computers, such as will be discussed below with respect to FIG. 36, configured to implement by executing instructions on one or more processors a platform-agnostic transaction-related communication system. In some embodiments, the transaction-related communication system includes one or more receiving modules, which can, in some example embodiments, be located in or executing on customer web browser 218, customer mobile device 210, merchant facing point of sale hardware 220, or integrated electronic commerce module 204, for receiving a first item of financial transaction information from a customer-facing interface (for example, in some embodiments customer facing mobile point of sale application 212 or customer facing web interface 216), and receiving a second item of financial transaction information from a merchant-facing point-of-sale interface (for example, in some embodiments merchant point of sale interface 222). As one of skill in the art will readily comprehend in light of having read the present disclosure, any function described as having been performed by a module or interface of the present disclosure can be performed by another interface or module of the present disclosure without departing from the scope and intent of the present disclosure.

In some embodiments, the transaction-related communication system includes a point of sale server (for example, in some embodiments located in customer mobile device 210) for rendering in a common internal format the first item of financial transaction information from the customer-facing interface (for example, in some embodiments customer facing mobile point of sale application 212), and rendering in the common internal format the second item of financial transaction information from the merchant-facing point-of-sale interface (for example, in some embodiments merchant point of sale interface 222). In some embodiments, the transaction-related communication system includes a payment processing module (for example, in some embodiments, contained within integrated electronic commerce module 204), for rendering in a second format the first item of financial transaction information for payment processing by a first external financial party (for example, in some embodiments payment processor 252), and rendering in a third format the first item of financial transaction information for payment processing by a second external financial party (for example, in some embodiments payment processor 254).

In some embodiments, the transaction-related communication system includes a transaction execution module (for example, in some embodiments, contained within integrated electronic commerce module 204), for transmitting in the second format the first item of financial transaction information for payment processing by the first external financial party (for example, in some embodiments payment processor 252), and transmitting in the third format the second item of financial transaction information for payment processing by the second external financial party (for example, in some embodiments payment processor 254).

In some embodiments, the system provides payment processing services from a plurality of disparate payment processors (for example, in some embodiments, payment processors 252-256) to a plurality of disparate transaction intake platforms (for example, in some embodiments customer mobile device 210 and merchant facing point of sale hardware 220). In some embodiments, the common internal format is a common intake transaction ticket format. In some embodiments, the one or more receiving modules include a single stack application program interface residing on one of the one or more servers (for example, in some embodiments as a part of single-stack standard application programming interface gateway 206). In some embodiments, the receiving the first item of financial transaction information from the customer-facing interface (for example, in some embodiments customer facing mobile point of sale application 212) further includes receiving in the common intake transaction ticket format over the network from a mobile computing device (for example, in some embodiments customer mobile device 210 or customer web browser 218) the first item of financial transaction information from the customer-facing interface (for example, in some embodiments customer facing mobile point of sale application 212). In some embodiments, the receiving the second item of financial transaction information from the merchant-facing point-of-sale interface (for example, in some embodiments merchant point of sale interface 222) further includes receiving over the network in the common intake transaction ticket format the second item of financial transaction information from the merchant-facing point-of-sale interface (for example, in some embodiments merchant facing point of sale hardware 220).

In some embodiments, the common internal format is a common intake transaction ticket format. In some embodiments, the system further includes a first translation module on a mobile computing device (for example, in some embodiments customer mobile device 210) for receiving from a customer facing application including the customer-facing interface (for example, in some embodiments customer facing mobile point of sale application 212) on the mobile computing device the first item of financial transaction information, and translating to a common intake transaction ticket format the first item of financial transaction information. In some embodiments, the system further includes a second translation module on a merchant-facing point of sale device (for example, in some embodiments merchant facing point of sale hardware 220) for receiving from a merchant facing application (for example, in some embodiments merchant point of sale interface 222) including the merchant-facing point-of-sale interface on a merchant point of sale device the second item of financial transaction information, and translating to the common intake transaction ticket format the second item of financial transaction information.

In some embodiments, the one or more receiving modules include a single stack application program interface residing on one of the one or more servers. In some embodiments, the server (for example, in some embodiments integrated electronic commerce module 204) communicates (for example, in some embodiments sending and receiving communications 214) remotely with the mobile computing device (for example, in some embodiments customer mobile device 210) over a wireless network (for example, in some embodiments network 250). In some embodiments, the server (for example, in some embodiments integrated electronic commerce module 204) communicates remotely with the merchant-facing point of sale device over a second network. In some embodiments, the receiving the first item of financial transaction information from the customer-facing interface (for example, in some embodiments in customer facing mobile point of sale application 212) further includes receiving in the common intake transaction ticket format at the single stack application interface (for example, in some embodiments in single-stack standard application programming interface gateway 206) from the mobile computing device the first item of financial transaction information from the customer-facing interface (for example, in some embodiments in customer-facing mobile point of sale application 212). In some embodiments, the receiving the second item of financial transaction information from the merchant-facing point-of-sale interface further includes receiving in the common intake transaction ticket format at the single stack application interface (for example, in some embodiments in single-stack standard application programming interface gateway 206) the second item of financial transaction information from the merchant-facing point-of-sale interface (for example, in some embodiments merchant point of sale interface 222).

In some embodiments, the transaction execution module (for example, in some embodiments in integrated electronic commerce module 204) is further configured for receiving on the one or more servers a transaction authorization confirmation from the first external financial party, and the point of sale server (for example, in some embodiments in integrated electronic commerce module 204) is further configured for transmitting to the customer-facing interface (for example, in some embodiments customer facing mobile point of sale application 212) an indication of the transaction authorization confirmation. In some embodiments, the payment processing module includes a payment processing gateway (for example, in some embodiments in single-stack standard application programming interface gateway 206) for communicating with servers of external financial processors (for example, in some embodiments payment processors 252-256) using encrypted links over a network 250.

In some embodiments, the system for providing payment processing services from a plurality of disparate payment processors (for example, in some embodiments payment processors 252-256) to a plurality of disparate transaction intake platforms further includes a business intelligence analytics module (for example, in some embodiments in integrated electronic commerce module 204) for providing business intelligence based at least in part on the first item of financial transaction information.

In some embodiments, the system for providing payment processing services from a plurality of disparate payment processors (for example, in some embodiments payment processors 252-256) to a plurality of disparate transaction intake platforms (for example, in some embodiments merchant facing point of sale hardware 220 and customer mobile device 210) further includes an inventory coordination module (for example, in some embodiments in integrated electronic commerce module 204) for providing transaction fulfillment information based at least in part on the first item of financial transaction information.

In some embodiments, the inventory coordination module enables the integrated electronic commerce module 204 to monitor consolidated stock levels and determine when to re-order, without relying on additional systems or manual reporting, thereby enabling merchants to provide a consistent, seamless experience for consumers across all channels, including offering returns through any channel no matter where the purchase originated.

Some embodiments of integrated electronic commerce module 204 support a merchant that operates a physical store, operates an online store, accepts payments on a mobile device, or any combination of those channels. Some embodiments of integrated electronic commerce module 204 present a single merchant account to reduce reconciliation and accounting headaches and to provide one version of the data through consolidated reports across all channels and touchpoints. Some embodiments of integrated electronic commerce module 204 can also handle the issues of managing inventory across mobile and e-commerce touchpoints, as well as in the store, providing a single view of the merchandise that's available to sell, and helping businesses balance between inventory and demand.

Some embodiments of integrated electronic commerce module 204 support a cloud-based point-of-sale, mobile and eCommerce framework that integrates payments with inventory management.

Some embodiments of integrated electronic commerce module 204 real-time, in-app inventory tracking, management and replenishment directly from a mobile application. Some embodiments of integrated electronic commerce module 204 provide import and export capabilities that allow merchants to easily transfer and integrate inventory data into other systems. Some embodiments of integrated electronic commerce module 204 provide Integration with third party eCommerce platforms—sales and inventory data by location provides merchants more valuable insights into their business. Some embodiments of integrated electronic commerce module 204 provide the ability to set replenishment thresholds and alerts and transfer inventory between locations and channels. Some embodiments of integrated electronic commerce module 204 adjust inventory for sales and returns in real-time and can also work with a merchant's existing inventory platform, by allowing merchants to integrate in to some embodiments of integrated electronic commerce module 204 using application program interfaces.

Some embodiments of integrated electronic commerce module 204 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of integrated electronic commerce module 204 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of integrated electronic commerce module 204 also allow developers to integrate payments, inventory and business insights into their platforms through the only single stack of application program interfaces for card present and card not present transactions.

Figure 3:
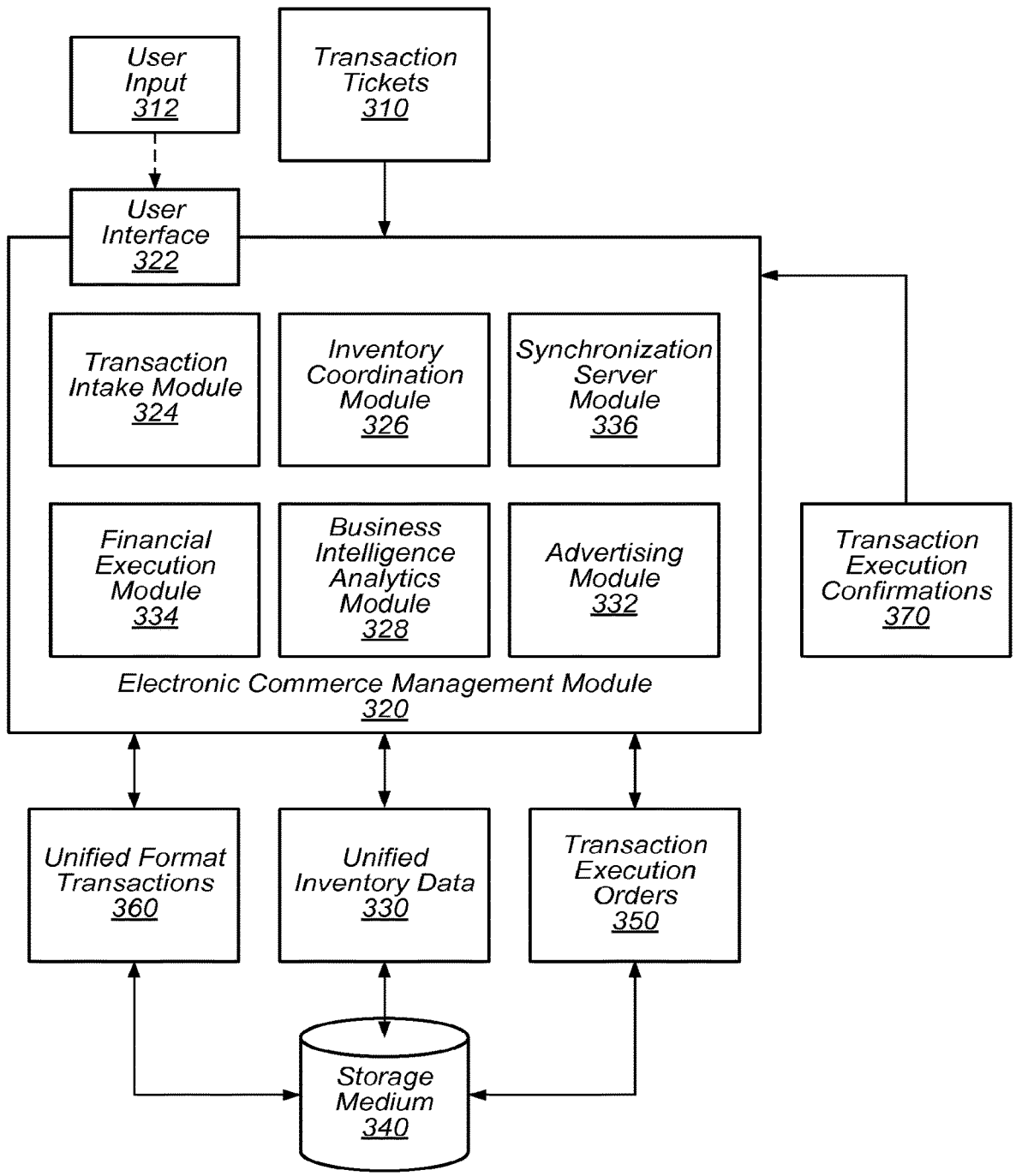
FIG. 3 depicts a module that may implement unified inventory and financial transaction management, according to some embodiments.

FIG. 3 depicts a module that may implement unified inventory and financial transaction management, according to some embodiments. An electronic commerce management module 320 receives as input transaction execution confirmations 370 transaction tickets 310 and user input 312 (for example, in some embodiments, through a user interface 322) and stores transaction execution orders 350, unified inventory data 330, and unified format transactions 360 in a storage medium 340. Electronic commerce management module 320 is one embodiment of integrated electronic commerce module 104 of FIG. 1, which is discussed above.

In some embodiments, electronic commerce management module 320 includes a transaction intake module 324, an inventory coordination module 326, a synchronization server module 336, a financial execution module 334, a business intelligence analytics module 328, and an advertising module 332.

In some embodiments, electronic commerce management module 320 implements or supports a system for providing payment processing services from a plurality of disparate payment processors to a plurality of disparate transaction intake platforms. In some embodiments, electronic commerce management module 320 includes one or more computers configured to implement by executing instructions on one or more processors a platform-agnostic transaction-related communication system. In some embodiments, electronic commerce management module 320 includes software for execution on one or more computers configured to implement by executing instructions on one or more processors a platform-agnostic transaction-related communication system. In some embodiments, the transaction-related communication system includes one or more receiving modules, such as transaction intake module 324, for receiving a first item of financial transaction information from a customer-facing interface, such as a user interface 322, which may be implemented on electronic commerce management module 320 or in a separate system, and receiving a second item of financial transaction information from a merchant-facing point-of-sale interface.

In some embodiments, the transaction-related communication system includes a point of sale server, for example as a component of financial execution module 334, for rendering in a common internal format (for example, for storage on storage medium 340 as unified format transactions 360) the first item of financial transaction information from the customer-facing interface of user interface 322, and rendering in the common internal format (for example, for storage on storage medium 340 as unified format transactions 360) the second item of financial transaction information from the merchant-facing point-of-sale interface. In some embodiments, the transaction-related communication system includes a payment processing module, for example as a component of financial execution module 334, for rendering in a second format (for example, as transaction execution orders 350) the first item of financial transaction information for payment processing by a first external financial party, and rendering in a third format (for example, as transaction execution orders 350) the first item of financial transaction information for payment processing by a second external financial party.

In some embodiments, the transaction-related communication system includes a transaction execution module, for example as a component of financial execution module 334, for transmitting in the second format the first item of financial transaction information for payment processing by the first external financial party, and transmitting in the third format the second item of financial transaction information for payment processing by the second external financial party.

In some embodiments, the system uses electronic commerce management module 320 for providing payment processing services from a plurality of disparate payment processors to a plurality of disparate transaction intake platforms. In some embodiments, the common internal format is a common intake transaction ticket format, which may be used in unified format transactions 360. In some embodiments, the one or more receiving modules, such as transaction intake module 324, include a single stack application program interface residing on one of the one or more servers that host or comprise electronic commerce management module 320. In some embodiments, the receiving the first item of financial transaction information, such as transaction tickets 310, from a customer-facing interface further includes receiving in the common intake transaction ticket format over the network from a mobile computing device the first item of financial transaction information from the customer-facing interface, such as a user interface 322 implemented on a system remote from electronic commerce management module 320. In some embodiments, the receiving the second item of financial transaction information, such as transaction tickets 310, from the merchant-facing point-of-sale interface further includes receiving over the network in the common intake transaction ticket format the second item of financial transaction information from the merchant-facing point-of-sale interface.

In some embodiments, the common internal format is a common intake transaction ticket format for use in transaction tickets 310. In some embodiments, the system further includes a first translation module on a mobile computing device, such as a user interface 322 implemented on a system remote from electronic commerce management module 320, for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules, such as transaction intake module 324, include a single stack application program interface residing on one of the one or more servers that host or comprise electronic commerce management module 320. In some embodiments, a server communicates remotely with the mobile computing device over a wireless network. In some embodiments, the server communicates remotely with the merchant-facing point of sale device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module, such as financial execution module 334, is further configured for receiving on the one or more servers a transaction authorization confirmation from the first external financial party, and the point of sale server is further configured for transmitting to the customer-facing interface an indication of the transaction authorization confirmation. In some embodiments, the payment processing module, such as financial execution module 334, includes a payment processing gateway for communicating with servers of external financial processors using encrypted links over a network.

In some embodiments, the system for providing payment processing services from a plurality of disparate payment processors to a plurality of disparate transaction intake platforms further includes a business intelligence analytics module 328 for providing business intelligence based at least in part on the first item of financial transaction information. In some embodiments, such business intelligence includes risk assessment for use in deciding whether to authorize or deny authorization for a transaction.

In some embodiments, the system for providing payment processing services from a plurality of disparate payment processors to a plurality of disparate transaction intake platforms further includes an inventory coordination module 326 for providing transaction fulfillment information based at least in part on the first item of financial transaction information. In some embodiments, the inventory coordination module 326 enables the integrated electronic commerce module 320 to monitor consolidated stock levels and determine when to re-order, without relying on additional systems or manual reporting, thereby enabling merchants to provide a consistent, seamless experience for consumers across all channels, including offering returns through any channel no matter where the purchase originated.

In some embodiments, the financial execution module 334 supports reconciling accounts for every channel, such that merchants may consolidate accounts with payment processors and accounting systems, without manual posting of entries.

Some embodiments of electronic commerce management module 320 support a merchant that operates a physical store, operates an online store, accepts payments on a mobile device, or any combination of those channels. Some embodiments of electronic commerce management module 320 present a single merchant account to reduce reconciliation and accounting headaches and to provide one version of the data through consolidated reports across all channels and touchpoints. Some embodiments of electronic commerce management module 320 can also handle the issues of managing inventory across mobile and e-commerce touchpoints, as well as in the store, providing a single view of the merchandise that's available to sell, and helping businesses balance between inventory and demand.

Some embodiments of electronic commerce management module 320 support a cloud-based point-of-sale, mobile and eCommerce framework that integrates payments with inventory management.

Some embodiments of electronic commerce management module 320 real-time, in-app inventory tracking, management and replenishment directly from a mobile application. Some embodiments of electronic commerce management module 320 provide import and export capabilities that allow merchants to easily transfer and integrate inventory data into other systems. Some embodiments of electronic commerce management module 320 provide Integration with third party eCommerce platforms—sales and inventory data by location provides merchants more valuable insights into their business. Some embodiments of electronic commerce management module 320 provide the ability to set replenishment thresholds and alerts and transfer inventory between locations and channels. Some embodiments of electronic commerce management module 320 adjust inventory for sales and returns in real-time and can also work with a merchant's existing inventory platform, by allowing merchants to integrate in to some embodiments of electronic commerce management module 320 using application program interfaces.

Some embodiments of electronic commerce management module 320 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of electronic commerce management module 320 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of electronic commerce management module 320 also allow developers to integrate payments, inventory and business insights into their platforms through the only single stack of application program interfaces for card present and card not present transactions.

In some embodiments, the synchronization server module 336 implements a synchronization server protocol that synchronizes data between a server, such as one of the one or more servers that host or comprise electronic commerce management module 320, and clients, such as ordering customer client 110 or merchant client 120 of FIG. 1, providing objects from database 102 of FIG. 1 from storage medium 340 that the clients have not received or that have been updated since client receipt.

In some embodiments, data synchronization from synchronization server module 336 allows clients to execute transactions or parts of transactions offline without querying one of the one or more servers that host or comprise electronic commerce management module 320, instead using local copies of objects from database 102 of FIG. 1. In some embodiments, database objects stored in storage medium 340 include serial numbers, and based on the serial number, and the fact that clients store a serial number (called an update ID) for their most recent transaction update, clients may send to one of the one or more servers that host or comprise electronic commerce management module 320 a database-wide pointer indicating the client's last received object (inserted or updated) to request from synchronization server module 336. In some embodiments, serial numbers for objects stored in storage medium 340 are assigned at object creation and new serial numbers are assigned at object update.

In some embodiments, synchronization server module receives a serial number and a list of query objects or object types of interest to the client and replies in the background of transaction flow with an update of all data (both new and updated) with serial numbers assigned after the pointer. In some embodiments, this update allows for off-peak updates of the database outside of time-critical traffic flow. The client then assimilates the reply objects into a local (sometimes partial) mirror copy of the database, as well as saving the pointer of the last updated object for use in the next query. When the client is updating certain objects for its own transaction, synchronization server module 336 also provides the updated state of the objects created or updated by the client and sends the update ID and modified and new objects resulting from the transaction, as well as any that may have been modified by another client.

Figure 4:
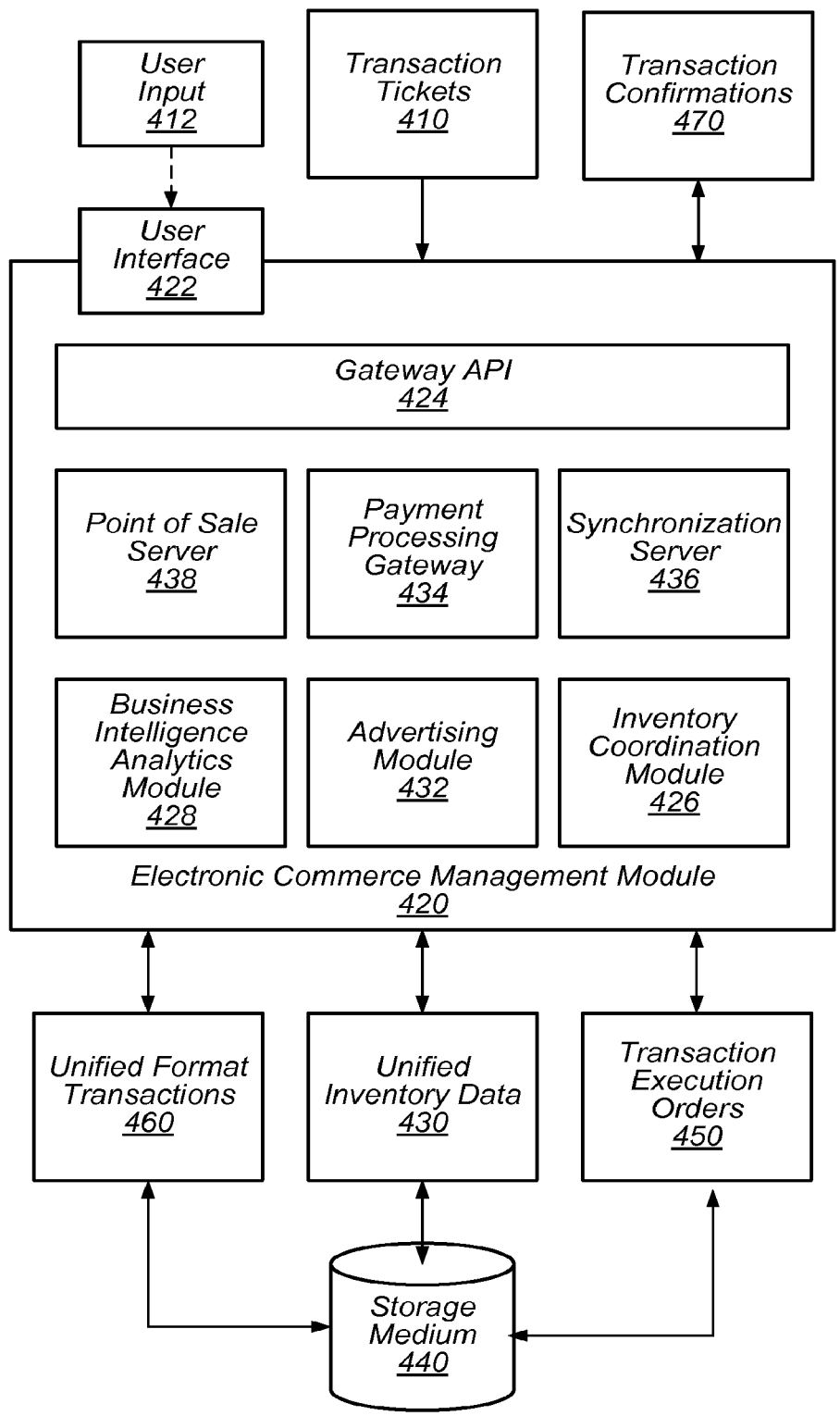
FIG. 4 illustrates a module that may implement unified inventory and financial transaction management, according to some embodiments.

FIG. 4 illustrates a module that may implement unified inventory and financial transaction management, according to some embodiments. An electronic commerce management module 420 receives as input transaction confirmations 470, transaction tickets 410 and user input 412 (for example, in some embodiments, through a user interface 422) and stores transaction execution orders 450, unified inventory data 430, and unified format transactions 460 in a storage medium 440. Electronic commerce management module 420 is one embodiment of integrated electronic commerce module 204 of FIG. 2, which is discussed above.

In some embodiments, electronic commerce management module 420 includes a transaction intake module such as a gateway application program interface 424, an inventory coordination module 426, a synchronization server module 436, a financial execution module such as a payment processing gateway 434, a business intelligence analytics module 428, and an advertising module 432.

In some embodiments, electronic commerce management module 420 implements or supports a system for providing payment processing services from a plurality of disparate payment processors to a plurality of disparate transaction intake platforms. In some embodiments, electronic commerce management module 420 includes one or more computers configured to implement by executing instructions on one or more processors a platform-agnostic transaction-related communication system. In some embodiments, electronic commerce management module 420 includes software for execution on one or more computers configured to implement by executing instructions on one or more processors a platform-agnostic transaction-related communication system. In some embodiments, the transaction-related communication system includes one or more receiving modules, such as gateway application program interface 424, for receiving a first item of financial transaction information from a customer-facing interface, such as a user interface 422, which may be implemented on electronic commerce management module 420 or in a separate system, and receiving a second item of financial transaction information from a merchant-facing point-of-sale interface.

In some embodiments, the transaction-related communication system includes a point of sale server 438, for example as a complement of payment processing gateway 434, for rendering in a common internal format (for example, for storage on storage medium 440 as unified format transactions 460) the first item of financial transaction information from the customer-facing interface of user interface 422, and rendering in the common internal format (for example, for storage on storage medium 440 as unified format transactions 460) the second item of financial transaction information from the merchant-facing point-of-sale interface. In some embodiments, the transaction-related communication system includes a payment processing module, for example as a component of payment processing gateway 434, for rendering in a second format (for example, as transaction execution orders 450) the first item of financial transaction information for payment processing by a first external financial party, and rendering in a third format (for example, as transaction execution orders 450) the first item of financial transaction information for payment processing by a second external financial party.

In some embodiments, the transaction-related communication system includes a transaction execution module, for example as a component of payment processing gateway 434, for transmitting in the second format the first item of financial transaction information for payment processing by the first external financial party, and transmitting in the third format the second item of financial transaction information for payment processing by the second external financial party. In some embodiments, the transaction execution module supports reconciling accounts for every channel, such that merchants may consolidate accounts with payment processors and accounting systems, without manual posting of entries.

In some embodiments, the system uses electronic commerce management module 420 for providing payment processing services from a plurality of disparate payment processors to a plurality of disparate transaction intake platforms. In some embodiments, the common internal format is a common intake transaction ticket format, which may be used in unified format transactions 460. In some embodiments, the one or more receiving modules, such as gateway application program interface 424, include a single stack application program interface residing on one of the one or more servers that host or comprise electronic commerce management module 420. In some embodiments, the receiving the first item of financial transaction information, such as transaction tickets 410, from a customer-facing interface further includes receiving in the common intake transaction ticket format over the network from a mobile computing device the first item of financial transaction information from the customer-facing interface, such as a user interface 422 implemented on a system remote from electronic commerce management module 420. In some embodiments, the receiving the second item of financial transaction information, such as transaction tickets 410, from the merchant-facing point-of-sale interface further includes receiving over the network in the common intake transaction ticket format the second item of financial transaction information from the merchant-facing point-of-sale interface.

In some embodiments, the common internal format is a common intake transaction ticket format for use in transaction tickets 410. In some embodiments, the system further includes a first translation module on a mobile computing device, such as a user interface 422 implemented on a system remote from electronic commerce management module 420, for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules, such as gateway application program interface 424, include a single stack application program interface residing on one of the one or more servers that host or comprise electronic commerce management module 420. In some embodiments, a server communicates remotely with the mobile computing device over a wireless network. In some embodiments, the server communicates remotely with the merchant-facing point of sale device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module, such as payment processing gateway 434, is further configured for receiving on the one or more servers a transaction authorization confirmation from the first external financial party, and the point of sale server is further configured for transmitting to the customer-facing interface an indication of the transaction authorization confirmation. In some embodiments, the payment processing module, such as payment processing gateway 434, includes a payment processing gateway for communicating with servers of external financial processors using encrypted links over a network.

In some embodiments, the inventory coordination module 426 enables the integrated electronic commerce module 420 to monitor consolidated stock levels and determine when to re-order, without relying on additional systems or manual reporting, thereby enabling merchants to provide a consistent, seamless experience for consumers across all channels, including offering returns through any channel no matter where the purchase originated.

Some embodiments of electronic commerce management module 420 support a merchant that operates a physical store, operates an online store, accepts payments on a mobile device, or any combination of those channels. Some embodiments of electronic commerce management module 420 present a single merchant account to reduce reconciliation and accounting headaches and to provide one version of the data through consolidated reports across all channels and touchpoints. Some embodiments of electronic commerce management module 420 can also handle the issues of managing inventory across mobile and e-commerce touchpoints, as well as in the store, providing a single view of the merchandise that's available to sell, and helping businesses balance between inventory and demand.

Some embodiments of electronic commerce management module 420 support a cloud-based point-of-sale, mobile and eCommerce framework that integrates payments with inventory management.

Some embodiments of electronic commerce management module 420 real-time, in-app inventory tracking, management and replenishment directly from a mobile application. Some embodiments of electronic commerce management module 420 provide import and export capabilities that allow merchants to easily transfer and integrate inventory data into other systems. Some embodiments of electronic commerce management module 420 provide Integration with third party eCommerce platforms—sales and inventory data by location provides merchants more valuable insights into their business. Some embodiments of electronic commerce management module 420 provide the ability to set replenishment thresholds and alerts and transfer inventory between locations and channels. Some embodiments of electronic commerce management module 420 adjust inventory for sales and returns in real-time and can also work with a merchant's existing inventory platform, by allowing merchants to integrate in to some embodiments of electronic commerce management module 420 using application program interfaces.

Some embodiments of electronic commerce management module 420 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of electronic commerce management module 420 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of electronic commerce management module 420 also allow developers to integrate payments, inventory and business insights into their platforms through the only single stack of application program interfaces for card present and card not present transactions.

Figure 5:
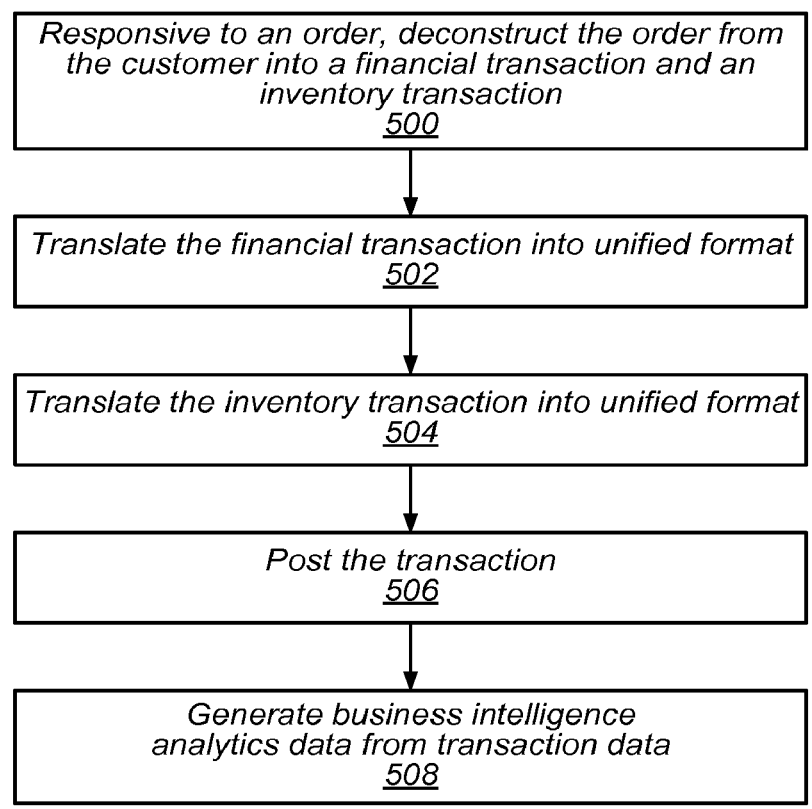
FIG. 5 is a flowchart of a process for unified inventory and financial transaction management, according to some embodiments.

FIG. 5 is a flowchart of a process for unified inventory and financial transaction management, according to some embodiments. Responsive to an order from a customer, the order from the customer is deconstructed into a financial transaction and an inventory transaction (block 500). The financial transaction is translated into a unified format (block 502). An inventory transaction is translated into the unified format (block 504). The transaction is posted (block 506). Business intelligence analytics data is generated from the transaction data (block 508).

Figure 6:
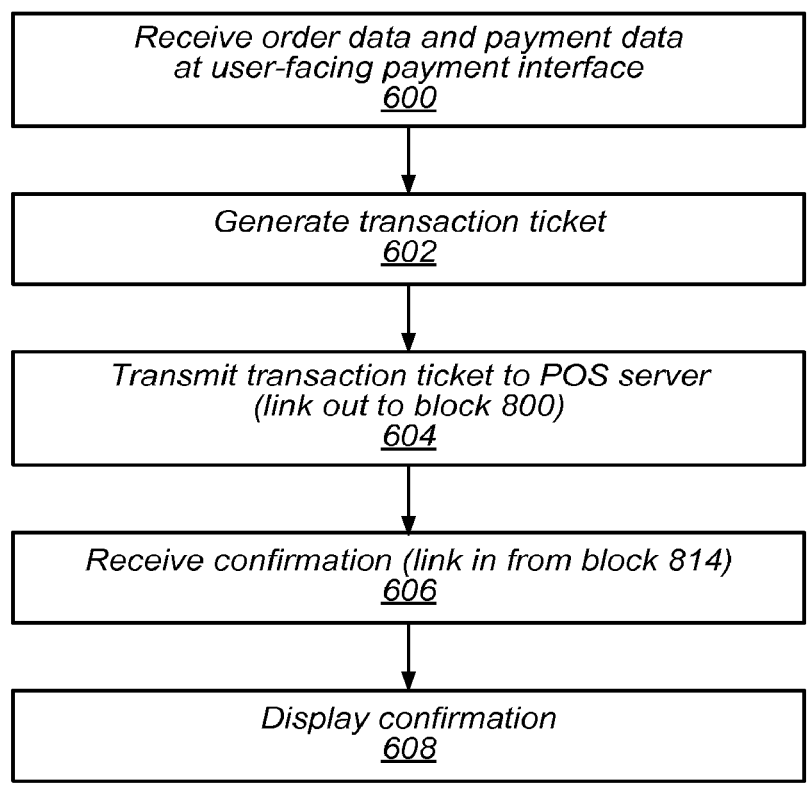
FIG. 6 is a flowchart of a process for unified inventory and financial transaction management, according to some embodiments.

FIG. 6 is a flowchart of a process for unified inventory and financial transaction management, according to some embodiments. Order data and payment data are received at user-facing payment interface (block 600). A transaction ticket is generated (block 602). The transaction ticket is transmitted to a point of sale server for processing (block 604). Confirmation is received (block 606). Confirmation is displayed (block 608).

Figure 7:
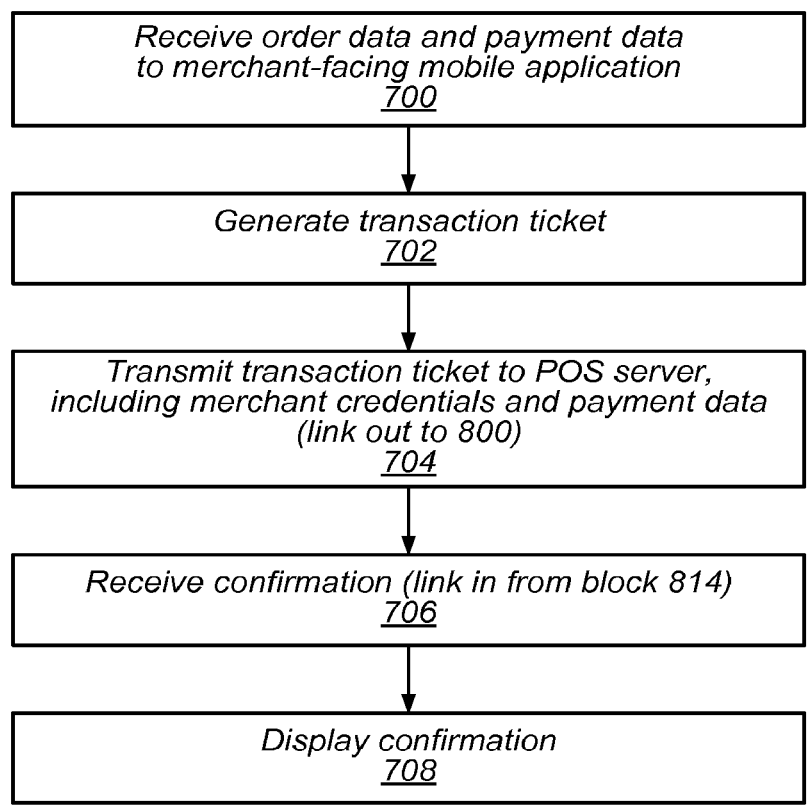
FIG. 7 is a flowchart of a process for unified inventory and financial transaction management, according to some embodiments.

FIG. 7 is a flowchart of a process for unified inventory and financial transaction management, according to some embodiments. Order data and payment data are received to a merchant-facing mobile application (block 700). A transaction ticket is generated (block 702). The transaction ticket is transmitted to a point of sale server for processing (block 704). Confirmation is received (block 706). Confirmation is displayed (block 708).

Figure 8:
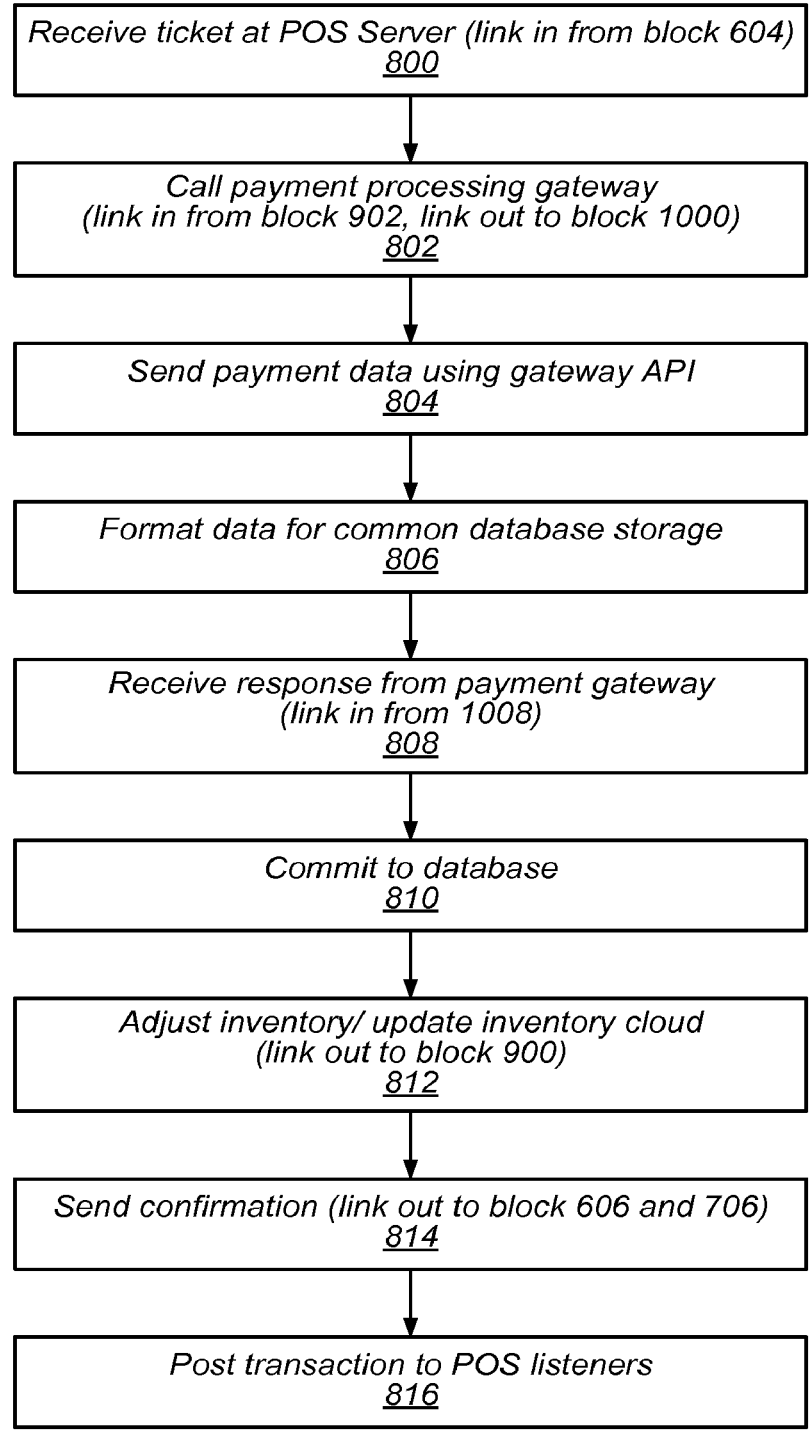
FIG. 8 is a flowchart of a process for unified inventory and financial transaction management, according to some embodiments.

FIG. 8 is a flowchart of a process for unified inventory and financial transaction management, according to some embodiments. A ticket is received at a point of sale server (block 800). A payment processing gateway is called (block 802). Payment data is sent to the payment gateway using the gateway application programming interface (block 804). Data is formatted for common database storage (block 806). Response is received from the payment gateway (block 808). Data is committed to the database (block 810). Inventory is adjusted and the inventory cloud is updated (block 812). Confirmation is sent (block 814). The transaction is posted to point of sale listeners (block 816).

Figure 9:
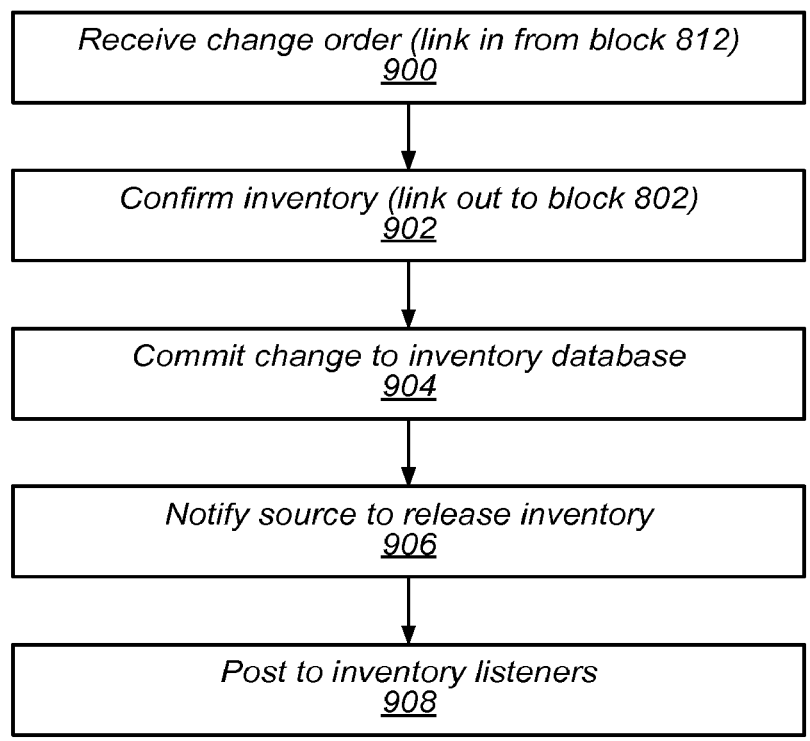
FIG. 9 is a flowchart of a process for unified inventory and financial transaction management, according to some embodiments.

FIG. 9 is a flowchart of a process for unified inventory and financial transaction management, according to some embodiments. A change order is received (block 900). Inventory is confirmed (block 902). The change is committed to the inventory database (block 904). A source is notified to release inventory (block 906). An update is posted to inventory listeners (block 908).

Figure 10:
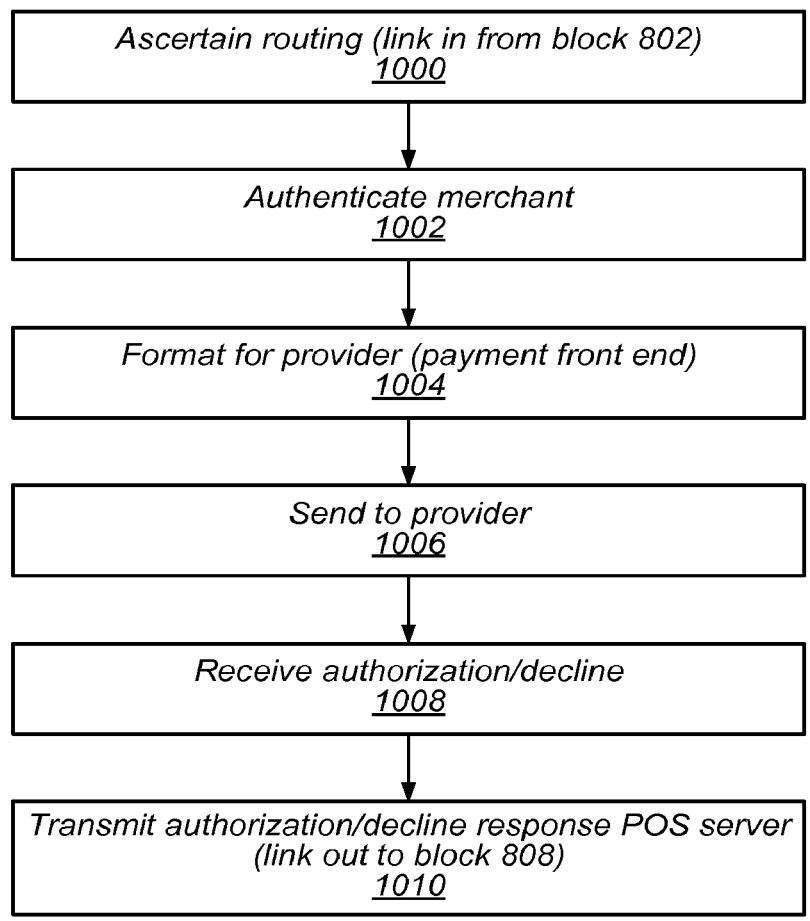
FIG. 10 is a flowchart of a process for unified inventory and financial transaction management, according to some embodiments.

FIG. 10 is a flowchart of a process for unified inventory and financial transaction management, according to some embodiments. Routing is ascertained (block 1000). A merchant is authenticated (block 1002). Formatting of the transaction for a provider (payment front end) is performed (block 1004). The transaction is sent to a provider (block 1006). An authorization or decline is received (block 1008). The authorization or decline response is transmitted to the point-of-sale server (block 1010).

Figure 11:
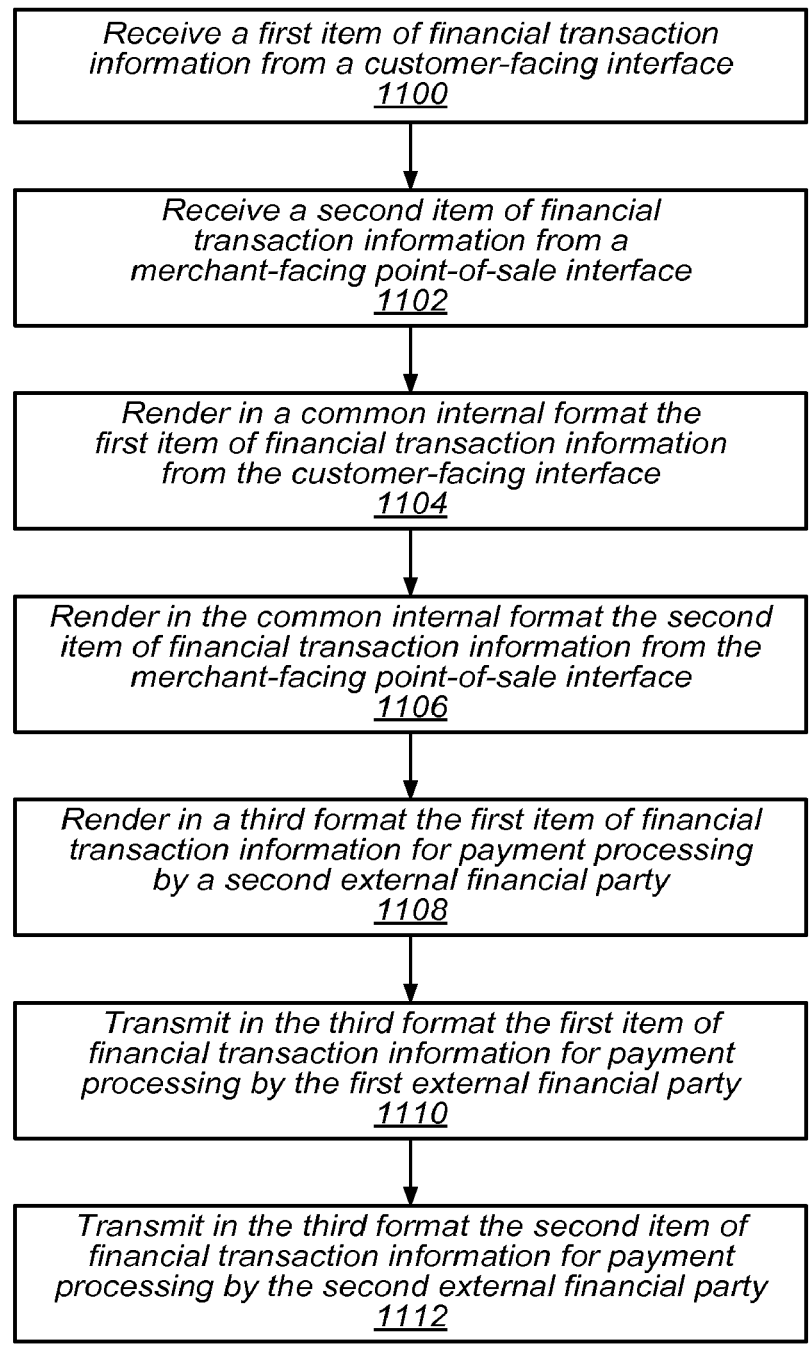
FIG. 11 is a flowchart of a process for unified inventory and financial transaction management, according to some embodiments.

FIG. 11 is a flowchart of a process for unified inventory and financial transaction management, according to some embodiments. A first item of financial transaction information is received from a customer-facing interface (block 1100). A second item of financial transaction information is received from a merchant-facing point-of-sale interface (block 1102). The first item of financial transaction information from the customer-facing interface is rendered in a common internal format (block 1104). The second item of financial transaction information from the merchant-facing point-of-sale interface is rendered in the common internal format (block 1106). A first item of financial transaction information for payment processing by a second external financial party is rendered in a third format (block 1108). The first item of financial transaction information is transmitted in the third format for payment processing by the first external financial party (block 1110). The second item of financial transaction information is transmitted in the third format for payment processing by the second external financial party (block 1112).

Figure 12:
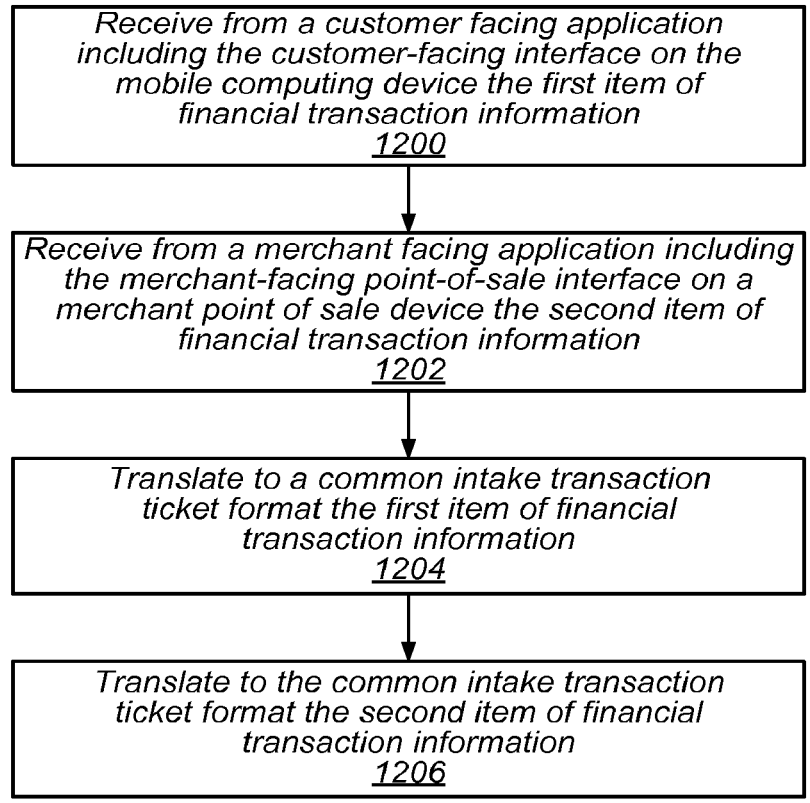
FIG. 12 is a flowchart of a process for unified inventory and financial transaction management, according to some embodiments.

FIG. 12 is a flowchart of a process for unified inventory and financial transaction management, according to some embodiments. A first item of financial transaction information is received from a customer facing application including a customer-facing interface on the mobile computing device (block 1200). A second item of financial transaction information is received from a merchant facing application including the merchant-facing point-of-sale interface on a merchant point of sale device (block 1202). The first item of financial transaction information is translated to a common intake transaction ticket format (block 1204). The second item of financial transaction information is translated to the common intake transaction ticket format (block 1206).

Figure 13:
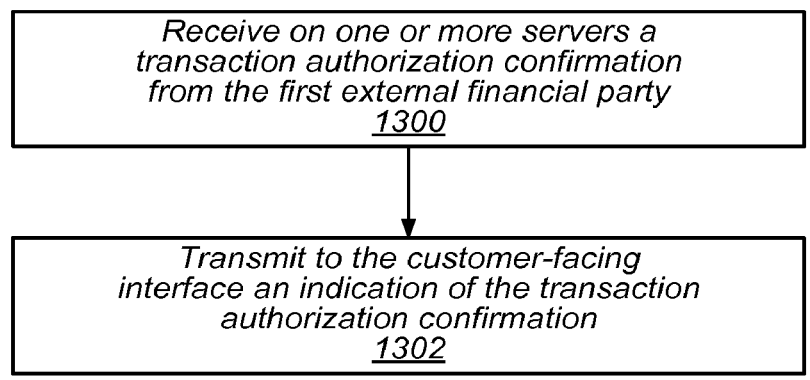
FIG. 13 is a flowchart of a process for unified inventory and financial transaction management, according to some embodiments.

FIG. 13 is a flowchart of a process for unified inventory and financial transaction management, according to some embodiments. A transaction authorization confirmation from the first external financial party is received on one or more servers (block 1300). An indication of the transaction authorization confirmation is transmitted to the customer-facing interface (block 1302).

Figure 14:
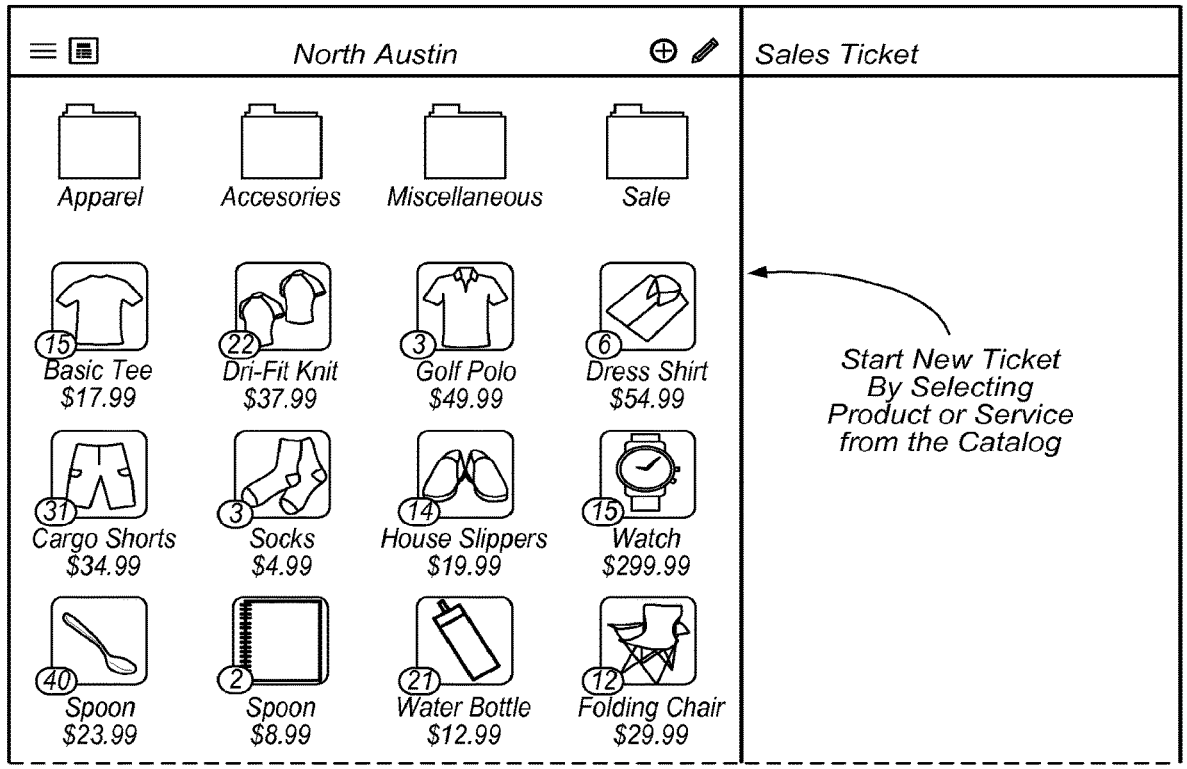
FIG. 14 is a user interface for creating a sales ticket for unified inventory and financial transaction management, according to some embodiments.

FIG. 14 is a user interface for creating a sales ticket for unified inventory and financial transaction management, according to some embodiments.

Figure 15:
FIG. 15 is a user interface for creating a sales ticket for unified inventory and financial transaction management, according to some embodiments.

FIG. 15 is a user interface for creating a sales ticket for unified inventory and financial transaction management, according to some embodiments.

Figure 16:
FIG. 16 is a user interface for creating a sales ticket for unified inventory and financial transaction management, according to some embodiments.

FIG. 16 is a user interface for creating a sales ticket for unified inventory and financial transaction management, according to some embodiments.

Figure 17:
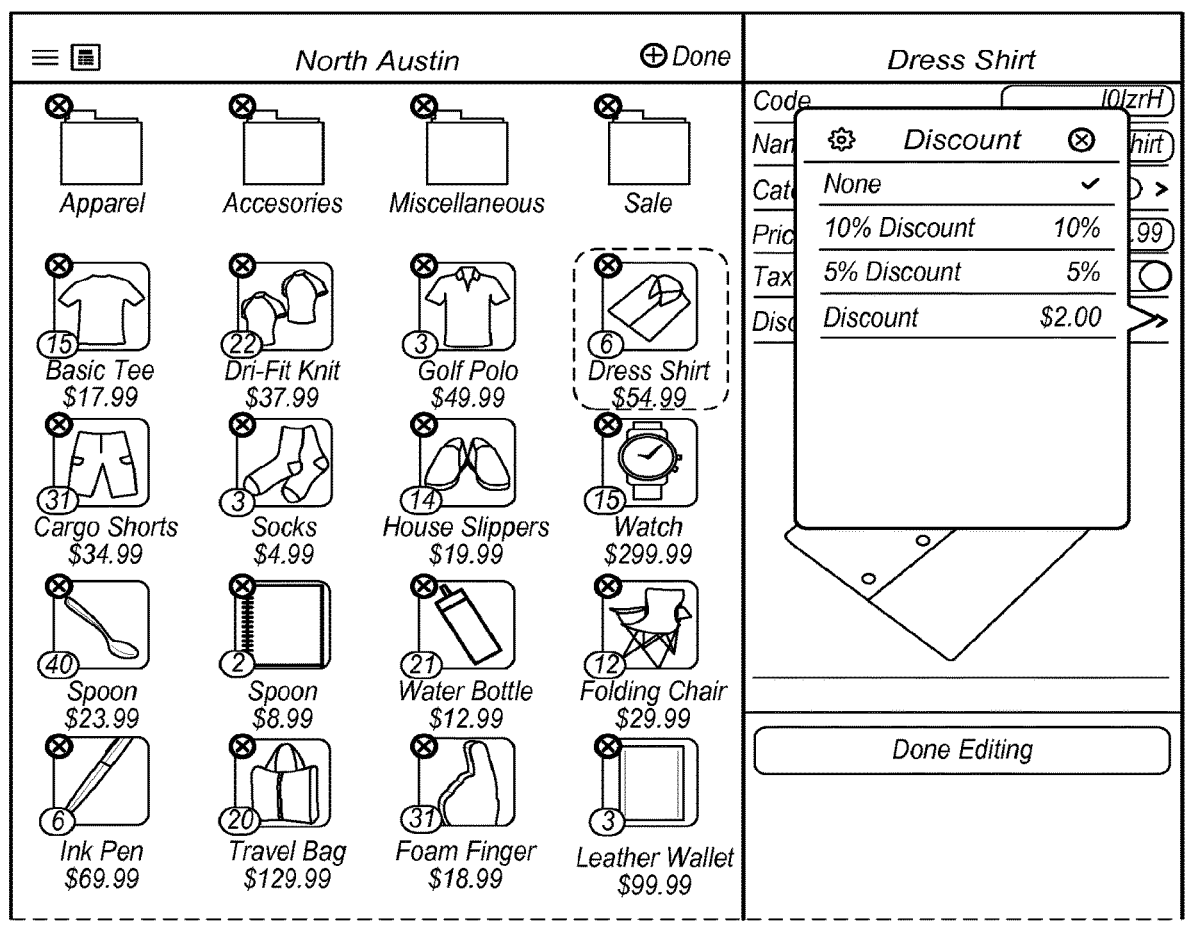
FIG. 17 is a user interface for creating a sales ticket for unified inventory and financial transaction management, according to some embodiments.

FIG. 17 is a user interface for creating a sales ticket for unified inventory and financial transaction management, according to some embodiments.

Figure 18:
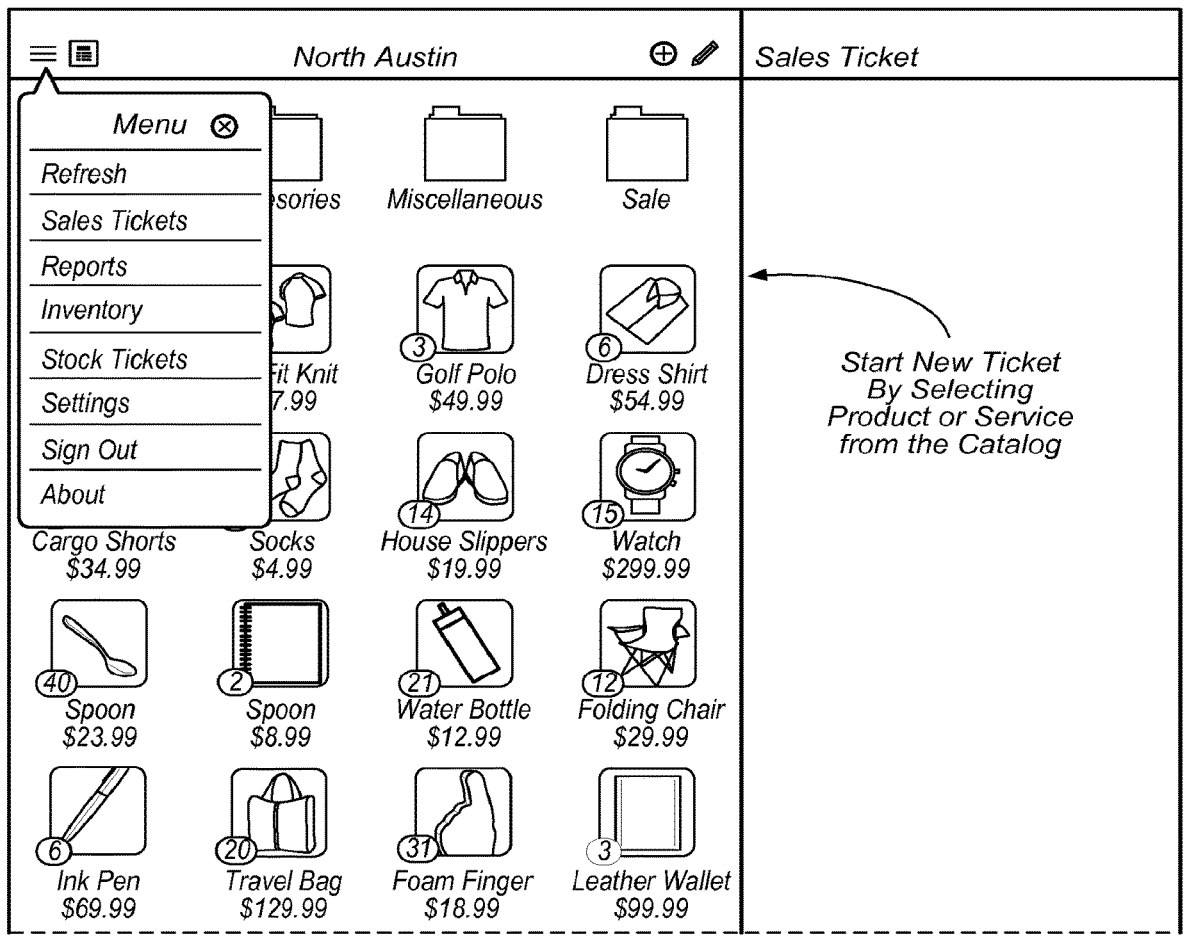
FIG. 18 is a user interface for creating a sales ticket for unified inventory and financial transaction management, according to some embodiments.

FIG. 18 is a user interface for creating a sales ticket for unified inventory and financial transaction management, according to some embodiments.

FIG. 19 is a user interface for selecting for review a sales ticket for unified inventory and financial transaction management, according to some embodiments.

Figure 20:
FIG. 20 is a user interface for reviewing a sales ticket for unified inventory and financial transaction management, according to some embodiments.

FIG. 20 is a user interface for reviewing a sales ticket for unified inventory and financial transaction management, according to some embodiments.

FIG. 21 is a user interface for selecting for review an item in a sales ticket for unified inventory and financial transaction management, according to some embodiments.

Figure 22:
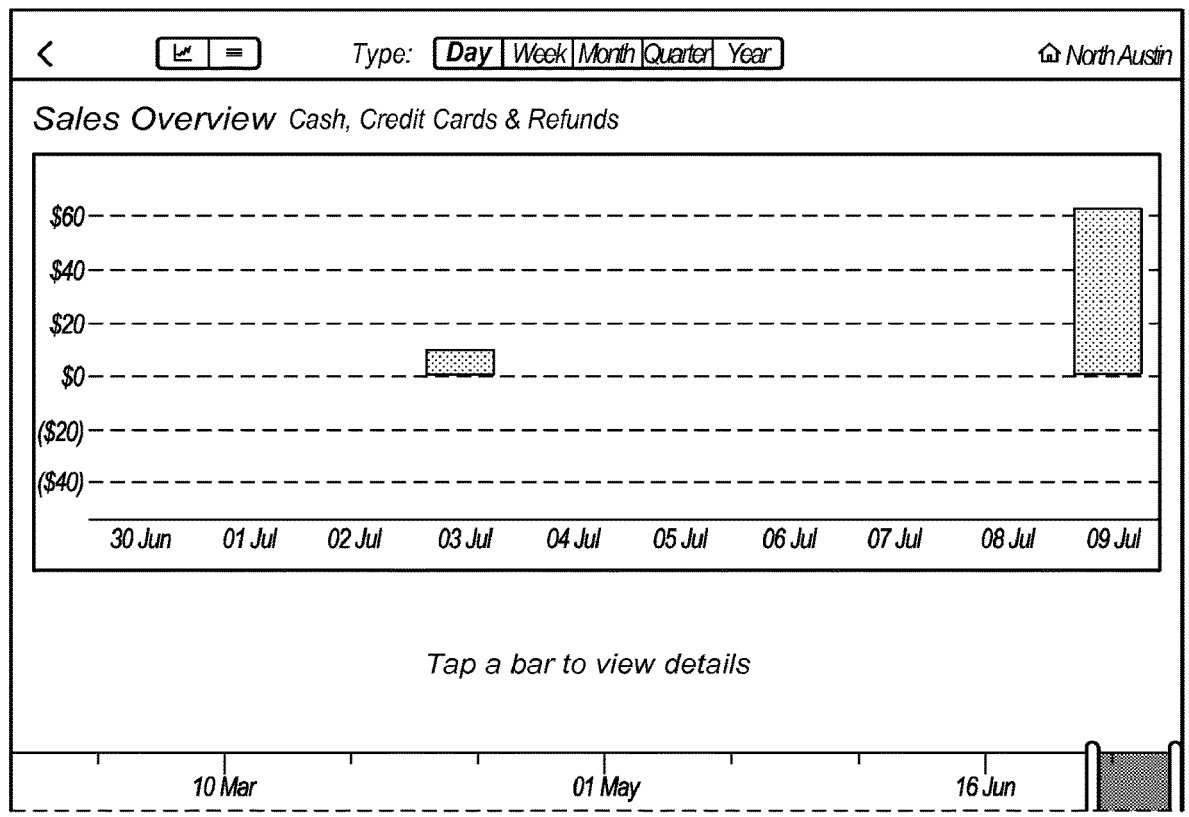
FIG. 22 is a user interface for reviewing an overview of transactions in a system for unified inventory and financial transaction management, according to some embodiments.

FIG. 22 is a user interface for reviewing an overview of transactions in a system for unified inventory and financial transaction management, according to some embodiments.

Figure 23:
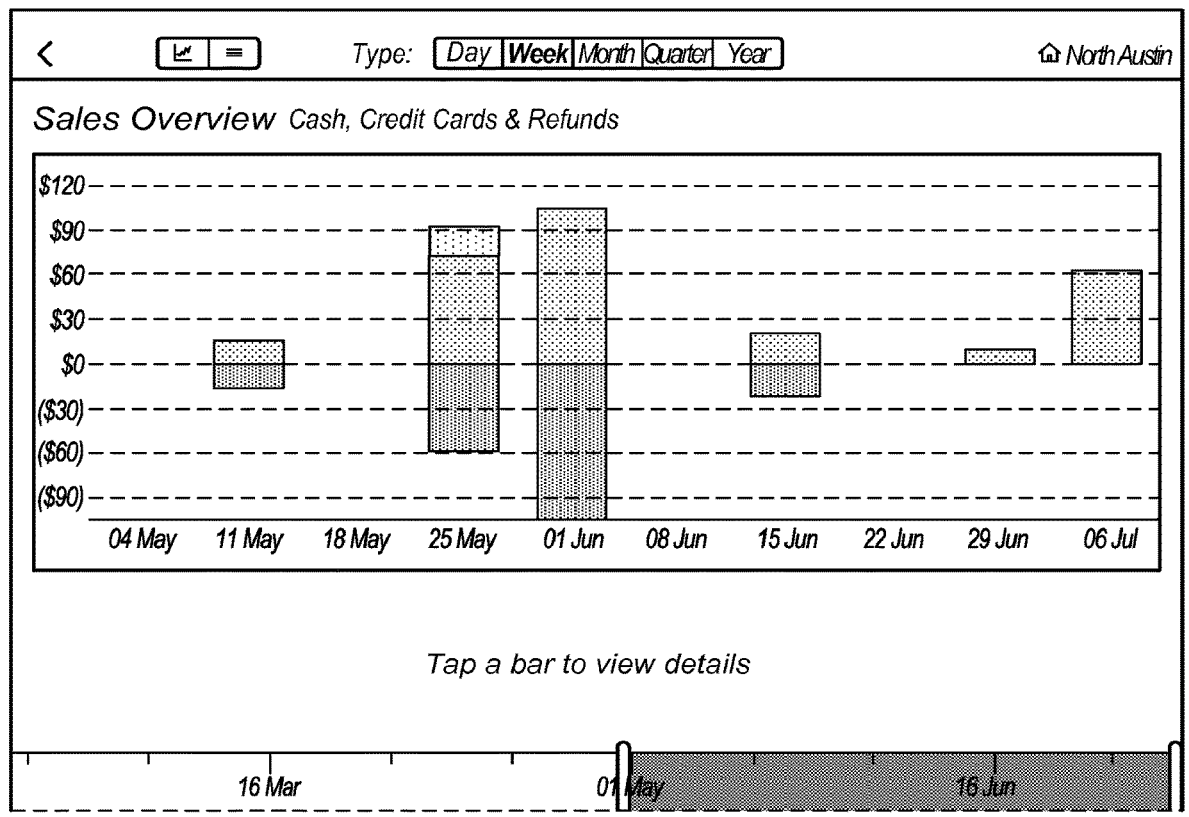
FIG. 23 is a user interface for reviewing an overview of transactions in a system for unified inventory and financial transaction management, according to some embodiments.

FIG. 23 is a user interface for reviewing an overview of transactions in a system for unified inventory and financial transaction management, according to some embodiments.

Figure 24:
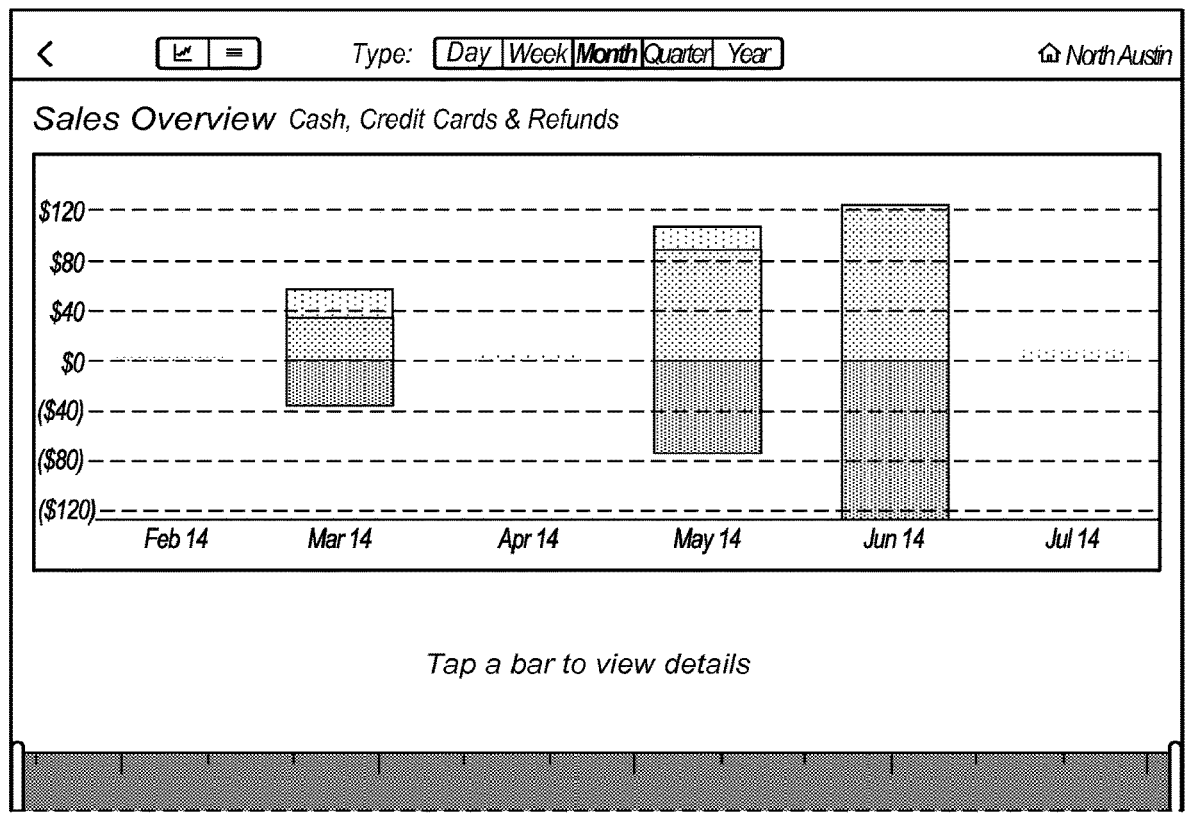
FIG. 24 is a user interface for reviewing an overview of transactions in a system for unified inventory and financial transaction management, according to some embodiments.

FIG. 24 is a user interface for reviewing an overview of transactions in a system for unified inventory and financial transaction management, according to some embodiments.

Figure 25:
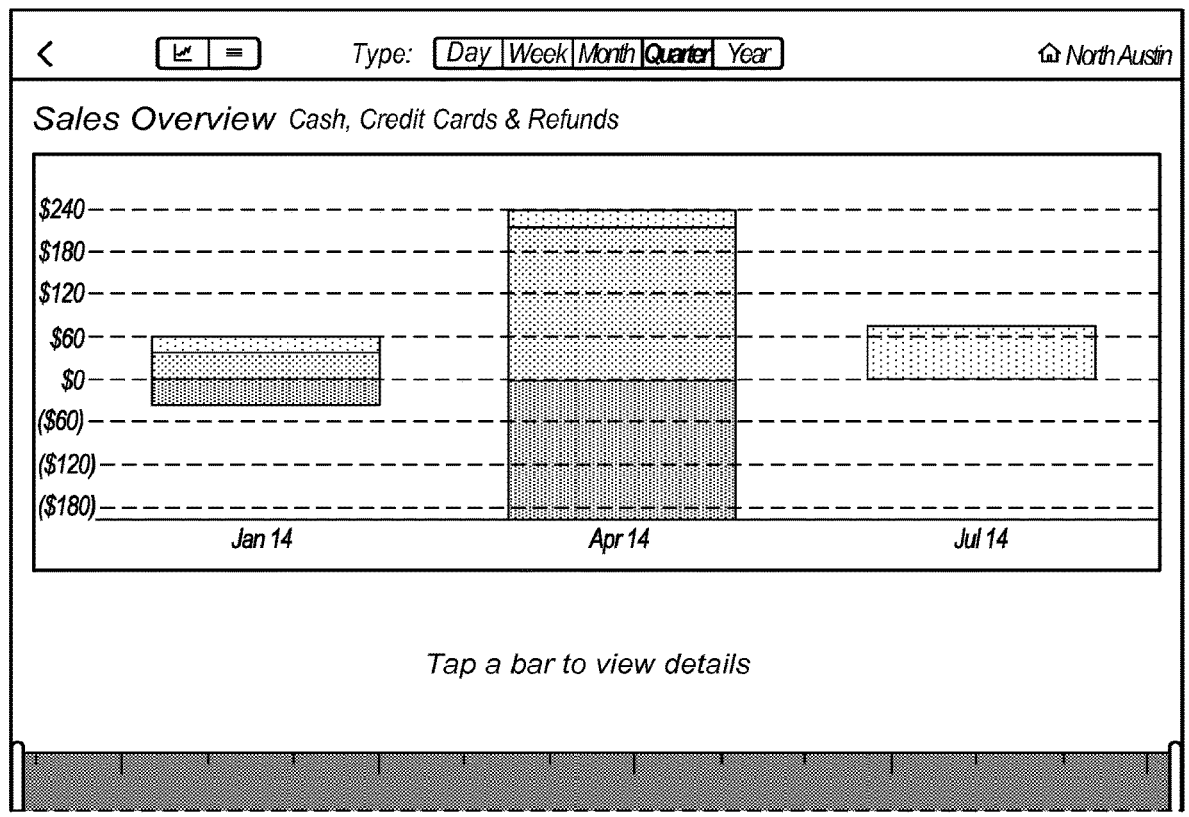
FIG. 25 is a user interface for reviewing an overview of transactions in a system for unified inventory and financial transaction management, according to some embodiments.

FIG. 25 is a user interface for reviewing an overview of transactions in a system for unified inventory and financial transaction management, according to some embodiments.

Figure 26:
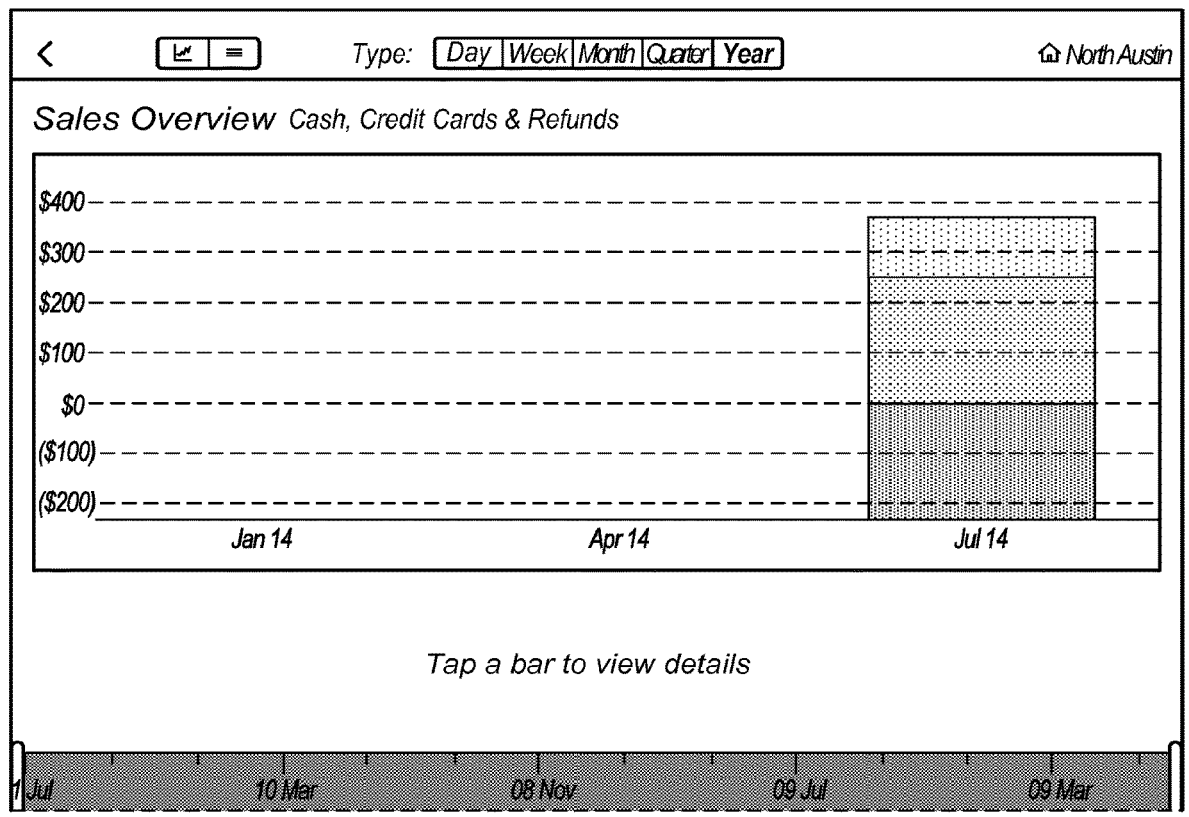
FIG. 26 is a user interface for reviewing an overview of transactions in a system for unified inventory and financial transaction management, according to some embodiments.

FIG. 26 is a user interface for reviewing an overview of transactions in a system for unified inventory and financial transaction management, according to some embodiments.

FIG. 27 is a user interface for reviewing an overview of transactions in a system for unified inventory and financial transaction management, according to some embodiments.

FIG. 28 is a user interface for reviewing an overview of transactions in a system for unified inventory and financial transaction management, according to some embodiments.

FIG. 29 is a user interface for reviewing an overview of transactions in a system for unified inventory and financial transaction management, according to some embodiments.

FIG. 30 is a user interface for reviewing an overview of transactions in a system for unified inventory and financial transaction management, according to some embodiments.

FIG. 31 is a user interface for reviewing an overview of transactions in a system for unified inventory and financial transaction management, according to some embodiments.

FIG. 32 is a user interface for reviewing an overview of inventory in a system for unified inventory and financial transaction management, according to some embodiments.

FIG. 33 is a user interface for reviewing an overview of transactions in a system for unified inventory and financial transaction management, according to some embodiments.

FIG. 34 is a user interface for recording a transaction in a system for unified inventory and financial transaction management, according to some embodiments.

Figure 35:
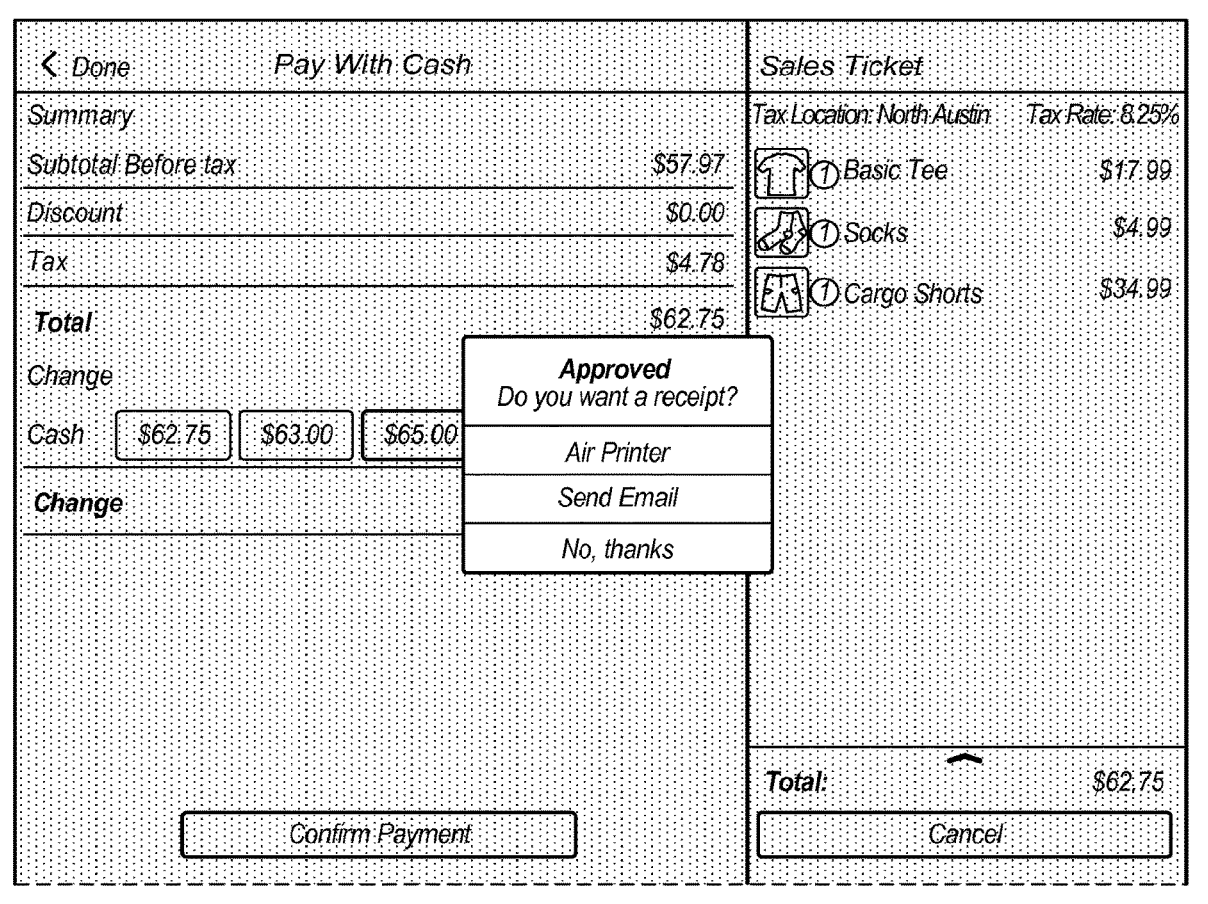

FIG. 35 is a user interface for reporting a transaction in a system for unified inventory and financial transaction management, according to some embodiments.

Figure 36:
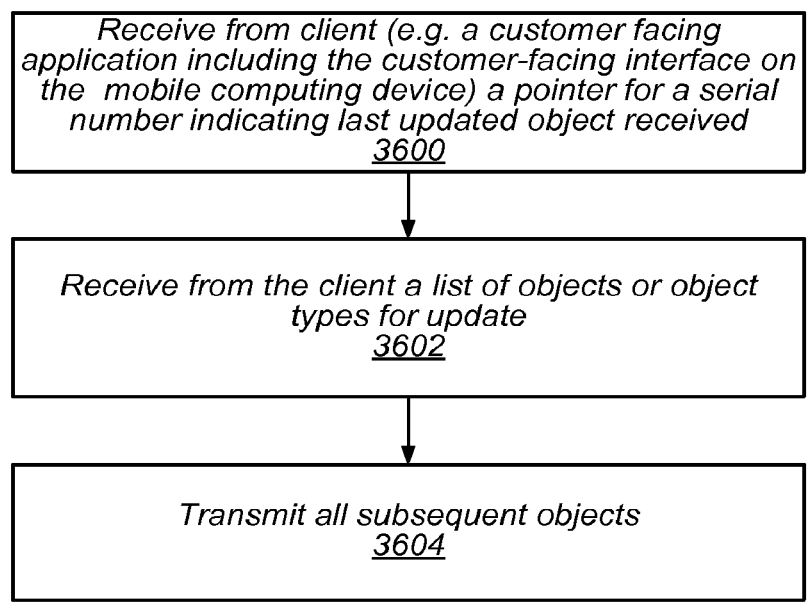
FIG. 36 is a flowchart of a synchronization method for unified inventory and financial transaction management, according to some embodiments.

FIG. 36 is a flowchart of a synchronization method for unified inventory and financial transaction management, according to some embodiments. A pointer for a serial number indicating a last updated object received is received from the client (block 3600). A list of objects or object types for update is received (block 3602). Subsequent objects are transmitted (block 3604).

Example System

Figure 37:
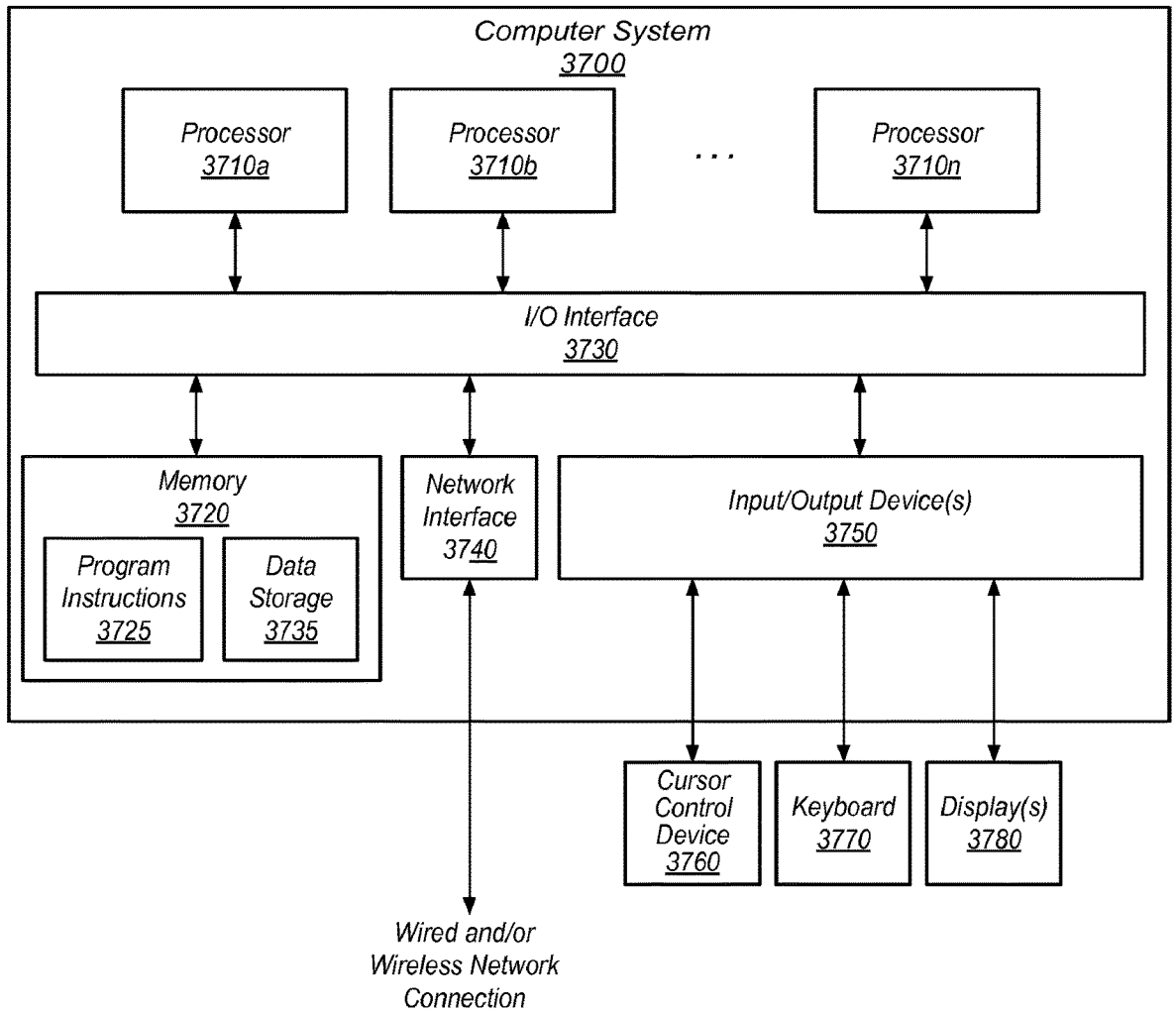
FIG. 37 illustrates an example computer system that may be used in embodiments.

Embodiments of an electronic commerce management module and/or of the production resources management techniques as described herein may be executed on one or more computer systems, which may interact with various other devices. One such computer system is illustrated by FIG. 37. In different embodiments, computer system 3700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 3700 includes one or more processors 3710 coupled to a system memory 3720 via an input/output (I/O) interface 3730. Computer system 3700 further includes a network interface 3740 coupled to I/O interface 3730, and one or more input/output devices 3750, such as cursor control device 3760, keyboard 3770, and display(s) 3780. In some embodiments, it is contemplated that embodiments may be implemented using a single instance of computer system 3700, while in other embodiments multiple such systems, or multiple nodes making up computer system 3700, may be configured to host different portions or instances of embodiments. For example, in one embodiment some elements may be implemented via one or more nodes of computer system 3700 that are distinct from those nodes implementing other elements.

In various embodiments, computer system 3700 may be a uniprocessor system including one processor 3710, or a multiprocessor system including several processors 3710 (e.g., two, four, eight, or another suitable number). Processors 3710 may be any suitable processor capable of executing instructions. For example, in various embodiments, processors 3710 may be general-purpose or embedded processors implementing any of a variety of instruction set architectures (ISAs), such as the x86, PowerPC, SPARC, or MIPS ISAs, or any other suitable ISA. In multiprocessor systems, each of processors 3710 may commonly, but not necessarily, implement the same ISA.

In some embodiments, at least one processor 3710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 3720 may be configured to store program instructions and/or data accessible by processor 3710. In various embodiments, system memory 3720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a electronic commerce management module are shown stored within system memory 3720 as program instructions 3725 and data storage 3735, respectively. In other embodiments, program instructions and/or data may be received, sent or stored upon different types of computer-accessible media or on similar media separate from system memory 3720 or computer system 3700. Generally speaking, a computer-accessible medium may include storage media or memory media such as magnetic or optical media, e.g., disk or CD/DVD-ROM coupled to computer system 3700 via I/O interface 3730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 3740.

In one embodiment, I/O interface 3730 may be configured to coordinate I/O traffic between processor 3710, system memory 3720, and any peripheral devices in the device, including network interface 3740 or other peripheral interfaces, such as input/output devices 3750. In some embodiments, I/O interface 3730 may perform any necessary protocol, timing or other data transformations to convert data signals from one component (e.g., system memory 3720) into a format suitable for use by another component (e.g., processor 3710). In some embodiments, I/O interface 3730 may include support for devices attached through various types of peripheral buses, such as a variant of the Peripheral Component Interconnect (PCI) bus standard or the Universal Serial Bus (USB) standard, for example. In some embodiments, the function of I/O interface 3730 may be split into two or more separate components, such as a north bridge and a south bridge, for example. In addition, in some embodiments some or all of the functionality of I/O interface 3730, such as an interface to system memory 3720, may be incorporated directly into processor 3710.

Network interface 3740 may be configured to allow data to be exchanged between computer system 3700 and other devices attached to a network, such as other computer systems, or between nodes of computer system 3700. In various embodiments, network interface 3740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3750 may, in some embodiments, include one or more display terminals, keyboards, keypads, touchpads, scanning devices, voice or optical recognition devices, or any other devices suitable for entering or retrieving data by one or more computer system 3700. Multiple input/output devices 3750 may be present in computer system 3700 or may be distributed on various nodes of computer system 3700. In some embodiments, similar input/output devices may be separate from computer system 3700 and may interact with one or more nodes of computer system 3700 through a wired or wireless connection, such as over network interface 3740.

As shown in FIG. 8, memory 3720 may include program instructions 3725, configured to implement embodiments of a electronic commerce management module as described herein, and data storage 3735, comprising various data accessible by program instructions 3725. In one embodiment, program instructions 3725 may include software elements of embodiments of a electronic commerce management module as illustrated in the above Figures. Data storage 3735 may include data that may be used in embodiments. In other embodiments, other or different software elements and data may be included.

Those skilled in the art will appreciate that computer system 3700 is merely illustrative and is not intended to limit the scope of a electronic commerce management module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 3700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3700 may be transmitted to computer system 3700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system for providing payment processing services from a plurality of disparate payment processors to a plurality of disparate transaction intake platforms, the system comprising one or more computers configured to perform operations comprising:
   receiving a first item of financial transaction information;
   receiving a second item of financial transaction information from a point-of-sale interface operating in a merchant-facing client application;
   rendering, in a common internal format, the first item of financial transaction information;
   rendering, in the common internal format, the second item of financial transaction information from the point-of-sale interface;
   translating the first item of financial transaction information to a common intake transaction ticket format via a first translation module; and
   translating the second item of financial transaction information to the common intake transaction ticket format via a second translation module.

2. The system of claim 1, wherein the operations further comprise:
   rendering, in a second format, the first item of financial transaction information;
   rendering, in a third format, the first item of financial transaction information;
   transmitting, in the second format, the first item of financial transaction information for payment processing by a first external financial party; and
   transmitting, in the third format, the second item of financial transaction information for payment processing by a second external financial party.

3. The system of claim 1, wherein:
   receiving the first item of financial transaction information comprises receiving the first item of financial transaction information in a common intake transaction ticket format; and
   receiving the second item of financial transaction information from the point-of-sale interface comprises receiving the second item of financial transaction information in the common intake transaction ticket format.

4. The system of claim 2, wherein the operations further comprise:
   receiving a transaction authorization confirmation from the first external financial party; and
   transmitting an indication of the transaction authorization confirmation.

5. The system of claim 2, wherein the operations further comprise:
   communicating with servers of external financial processors using encrypted links over a network.

6. The system of claim 1, wherein the operations further comprise:
   providing business intelligence based at least in part on the first item of financial transaction information.

7. The system of claim 1, wherein the operations further comprise:
   providing transaction fulfillment information based at least in part on the first item of financial transaction information.

8. A method for providing payment processing services from a plurality of disparate payment processors to a plurality of disparate transaction intake platforms, the method comprising:
   receiving a first item of financial transaction information;
   receiving a second item of financial transaction information from a point-of-sale interface operating in a merchant-facing client application;
   rendering, in a common internal format, the first item of financial transaction information;
   rendering, in the common internal format, the second item of financial transaction information from the point-of-sale interface;
   translating the first item of financial transaction information to a common intake transaction ticket format via a first translation module; and
   translating the second item of financial transaction information to the common intake transaction ticket format via a second translation module.

9. The method of claim 8, wherein the method further comprises:
   rendering, in a second format, the first item of financial transaction information;
   rendering, in a third format, the first item of financial transaction information;
   transmitting, in the second format, the first item of financial transaction information for payment processing by a first external financial party; and
   transmitting, in the third format, the second item of financial transaction information for payment processing by a second external financial party.

10. The method of claim 8, wherein:
    receiving the first item of financial transaction information comprises receiving the first item of financial transaction information in a common intake transaction ticket format; and
    receiving the second item of financial transaction information from the point-of-sale interface comprises receiving the second item of financial transaction information in the common intake transaction ticket format.

11. The method of claim 9, wherein the method further comprises:
    receiving a transaction authorization confirmation from the first external financial party; and
    transmitting an indication of the transaction authorization confirmation.

12. The method of claim 8, wherein the method further comprises:
    communicating with servers of external financial processors using encrypted links over a network.

13. The method of claim 8, wherein the methods further comprise:
    providing business intelligence based at least in part on the first item of financial transaction information.

14. The method of claim 8, wherein the operations further comprise:

providing transaction fulfillment information based at least in part on the first item of financial transaction information.

15. A non-transitory computer-readable storage medium storing program instructions for providing payment processing services from a plurality of disparate payment processors to a plurality of disparate transaction intake platforms, wherein the program instructions are computer-executable to implement operations comprising:
- receiving a first item of financial transaction information;
- receiving a second item of financial transaction information from a point-of-sale interface operating in a merchant-facing client application;
- rendering, in a common internal format, the first item of financial transaction information;
- rendering, in the common internal format, the second item of financial transaction information from the point-of-sale interface;
- translating the first item of financial transaction information to a common intake transaction ticket format via a first translation module; and
- translating the second item of financial transaction information to the common intake transaction ticket format via a second translation module.

16. The non-transitory computer-readable medium of claim 15, wherein the operations further comprise:
- rendering, in a second format, the first item of financial transaction information;
- rendering, in a third format, the first item of financial transaction information;
- transmitting, in the second format, the first item of financial transaction information for payment processing by a first external financial party; and
- transmitting, in the third format, the second item of financial transaction information for payment processing by a second external financial party.

17. The non-transitory computer-readable medium of claim 15, wherein:
- receiving the first item of financial transaction information comprises receiving the first item of financial transaction information in a common intake transaction ticket format; and
- receiving the second item of financial transaction information from the point-of-sale interface comprises receiving the second item of financial transaction information in the common intake transaction ticket format.

18. The non-transitory computer-readable medium of claim 16, wherein the operations further comprise:
- receiving a transaction authorization confirmation from the first external financial party; and
- transmitting an indication of the transaction authorization confirmation.

19. The non-transitory computer-readable medium of claim 15, wherein the operations further comprise:
- communicating with servers of external financial processors using encrypted links over a network.

20. The non-transitory computer-readable medium of claim 15, wherein the operations further comprise:
- providing business intelligence based at least in part on the first item of financial transaction information.

* * * * *